(12) United States Patent
Van Wageningen et al.

(10) Patent No.: US 11,968,581 B2
(45) Date of Patent: Apr. 23, 2024

(54) FAST SECURE HANDOVER

(71) Applicant: SIGNIFY HOLDING B.V., Eindhoven (NL)

(72) Inventors: Andries Van Wageningen, Wajlre (NL); Piotr Polak, Eindhoven (NL); Sahil Sharma, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 51 days.

(21) Appl. No.: 17/908,320

(22) PCT Filed: Mar. 1, 2021

(86) PCT No.: PCT/EP2021/055039
§ 371 (c)(1),
(2) Date: Aug. 31, 2022

(87) PCT Pub. No.: WO2021/175778
PCT Pub. Date: Sep. 10, 2021

(65) Prior Publication Data
US 2023/0111629 A1 Apr. 13, 2023

(30) Foreign Application Priority Data
Mar. 5, 2020 (EP) ..................................... 20161207

(51) Int. Cl.
*H04W 36/08* (2009.01)
*H04B 10/112* (2013.01)
(Continued)

(52) U.S. Cl.
CPC ........ *H04W 36/08* (2013.01); *H04B 10/1129* (2013.01); *H04W 12/037* (2021.01);
(Continued)

(58) Field of Classification Search
None
See application file for complete search history.

(56) References Cited

U.S. PATENT DOCUMENTS 9,882,640 B1  1/2018  Chaudhuri et al.
10,142,030 B1 *  11/2018  Blanks ................. H04B 10/503
(Continued)

FOREIGN PATENT DOCUMENTS

EP          1887758 A2    2/2008

OTHER PUBLICATIONS

Sangeetha Bangolae, et al., "Performance Study of Fast BSS Transition Using", IEEE 802.11r, International Wireless Communications and Mobile Computing Conference: IWCMC 2006; Jul. 3, 2006, pp. 737-742.
(Continued)

*Primary Examiner* — Darren E Wolf

(57) ABSTRACT

Because of the line-of-sight character of optical wireless communication and a limited field-of-view of optical receivers, the coverage of an access point and the overlapping coverage area of adjacent access points in an optical system are smaller as compared to a RF system. It turns more challenging to support an end point (110) to roam securely in an optical multi-cell wireless communication network. To speed up the derivation of a new pairwise transient key with a new access point during a handover procedure, the end point of this invention comprises a controller (118) that is configured to act as a second supplicant (1181), on behalf of a first supplicant (1186) comprised in a host processor (1185), to communicate with an authenticator to establish a new pairwise transient key for the end point (110) and a candidate access point, and an active pairwise transient key with the currently associated access point is used to secure the communication for new key derivation.

13 Claims, 9 Drawing Sheets

(51) Int. Cl.
*H04B 10/40* (2013.01)
*H04W 12/037* (2021.01)
*H04W 12/041* (2021.01)
*H04W 12/06* (2021.01)
*H04W 36/00* (2009.01)
*H04B 10/50* (2013.01)
*H04B 10/60* (2013.01)

(52) U.S. Cl.
CPC ......... *H04W 12/041* (2021.01); *H04W 12/06* (2013.01); *H04W 36/0038* (2013.01); *H04W 36/00837* (2018.08); *H04B 10/40* (2013.01); *H04B 10/50* (2013.01); *H04B 10/60* (2013.01)

(56) References Cited

U.S. PATENT DOCUMENTS

| | | | |
|---|---|---|---|
| 11,128,376 B1* | 9/2021 | Passe | H04W 12/082 |
| 2021/0067249 A1* | 3/2021 | Hull | H04B 10/1143 |

OTHER PUBLICATIONS

Piotr Polak, "G.vlc: 802.1X Port-Based Authentication"; C1950, International Telecommunication Union, Geneva, Switzerland, vol. 18/15, Jan. 30, 2020, pp. 1-6.

* cited by examiner

FAST SECURE HANDOVER

CROSS-REFERENCE TO PRIOR APPLICATIONS

This application is the U.S. National Phase application under 35 U.S.C. § 371 of International Application No. PCT/EP2021/055039, filed on Mar. 1, 2021, which claims the benefit of European Patent Application No. 20161207.4, filed on Mar. 5, 2020. These applications are hereby incorporated by reference herein.

FIELD OF THE INVENTION

The invention relates to the field of roaming of network devices in optical wireless networks, such as Li-Fi networks. More particularly, various methods, apparatus, systems and computer-readable media are disclosed herein related to assist a network device to have a fast handover from one access point to another in a secure manner.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over the wireless radio frequency communication make Li-Fi a promising solution to mitigate the pressure on the crowded radio spectrum for IoT applications. Other benefits of Li-Fi include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Thus, Li-Fi is generally accepted as a derivative of optical wireless communications (OWC) technology, which makes use of the light spectrum in a broad scope to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is the same, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

In the following, the term "access point" of a Li-Fi system is used to designate a logical access device that can be connected to one or more physical access devices (e.g. optical transceivers). Such a physical access device may typically, but not necessary, be located at a luminaire and the logical access point may be connected to one or more physical access devices each located at one or more luminaires. An access point serves one or more network devices or end devices associated to it to form an optical cell.

Li-Fi has an intrinsic benefit to reduce the chance of eavesdropping as compared to a radio frequency (RF)-based communication system, because of the physical property of an optical link requiring line-of-sight communication. On top of this intrinsic advantage, the security aspect can be further enhanced in a Li-Fi system by introducing security dedicated measures, such as authentication and encryption.

The extensible authentication protocol (EAP) is an authentication framework commonly used for wireless networks and Internet connections. The IEEE 802.1X standard defines how to provide authentication for devices trying to connect with other devices on LANs or wireless LANs (WLANs), which specifies the encapsulation of EAP over IEEE 802 standard. Therefore, IEEE 802.1X is also called "EAP over LAN or WLAN". IEEE 802.1X authentication involves three parties: a supplicant, an authenticator, and an authentication server. The supplicant is a client or end device that wishes to get access to the LAN/WLAN. The authenticator is a network device which provides a data link between the client and the network and can allow or block network traffic between the two, such as an Ethernet switch or a wireless access point. The authentication server is typically a trusted server that can receive and respond to requests from clients for network access and can tell the authenticator if the connection is to be allowed, and various settings that should apply to that client's connection or setting. Authentication servers typically run software supporting the Remote Authentication Dial-In User Service (RADIUS) and EAP protocols.

In order to generate encryption keys to encrypt the actual data, a 4-way handshake is typically required to exchange four messages between an authenticator and a client device, or supplicant. Depending on the type of communication, different keys may be used. The master session key (MSK) is the first key that is generated either from IEEE 802.1X/EAP or derived from pre-shared key (PSK) authentication. Group temporal key (GTK) is used to encrypt all broadcast and multicast traffic between an access point and multiple client devices, which is shared between the multiple client devices and one access point. Pairwise Transit Key (PTK) is used to encrypt all unicast traffic between a client station and the access point. Therefore, PTK is unique between a client station and the access point. Pairwise master key (PMK) is the key generated from master session key (MSK), and the PTK is dependent on the PMK. Similarly, group master key (GMK) is also generated from master session key (MSK), and the GTK is dependent on GMK.

However, the procedures for authentication and security key establishment result in extra latency when a network device sets up a link in a network for the first time, or when it roams from one cell to another. Furthermore, if the network device is in the middle of a communication session during the handover from one cell to another, such extra latency may be even more problematic.

Sangeetha Bangolae et al., "Performance study of fast BSS transition using IEEE 802.11r" is related to the evaluation of WLAN roaming capabilities affected by the standard of IEEE 802.11r.

SUMMARY OF THE INVENTION

Because of the line-of-sight character of optical wireless communication and a limited field-of-view (FoV) of optical receivers, the coverage of an access point (AP) and the overlapping coverage area of adjacent APs in an optical system are smaller as compared to a RF based system. Due to the small coverage area per optical access point or per optical cell and due to a need to reduce mutual interference among adjacent access points, the overlapping coverage areas of adjacent cells in such optical systems are also typically small. Therefore, a moving end point in an optical wireless network will require much faster transitions (e.g. handovers) between access points than for a RF-based network or other type of cellular network with large coverage area per access point and large overlapping areas. Therefore, to support an end point to carry out a secure and smooth handover from one optical access point to another becomes more challenging.

In view of the above, the present disclosure is directed to methods, apparatus, systems, computer program and computer-readable media for providing a mechanism to support a fast secure handover of an end point (EP) from an access point (AP) currently associated with the EP to another AP out of a plurality of APs. More particularly, the goal of this invention is achieved by an end point subsystem as claimed in claim 1, by a system as claimed in claim 7, by methods as claimed in claims 11 and 13 for the end point subsystem and authenticator respectively, and by a computer program as claimed in claim 15.

Accordingly, in order to speed up the derivation of a new pairwise transient key or a new pairwise security key with a new access point during a handover procedure, the end point subsystem of this invention comprises a host processor that is configured to act as a first supplicant to establish an initial pairwise transient key or an initial pairwise security key for the end point subsystem; and a controller that is configured to act as a second supplicant to communicate with an authenticator to establish a new pairwise transient key for the end point subsystem and a candidate access point, and an active pairwise transient key with the currently associated access point is used in the communication to derive the new key.

In accordance with a first aspect of the invention an end point subsystem is provided. The end point subsystem for performing a secure handover from an access point currently associated with the end point subsystem to another access point out of a plurality of access points in an optical multi-cell wireless communication network, the end point subsystem comprising: an optical transceiver configured to perform optical wireless communication; a controller configured to secure an optical wireless communication link with the currently associated access point by using a pairwise transient key to encrypt or decrypt data communicated on the link; a host processor configured to act as a first supplicant to carry out a first procedure for establishing an initial pairwise transient key with an authenticator for the end point subsystem in the optical multi-cell wireless communication network. The controller is further configured to act as a second supplicant to prepare for a secure handover to a candidate access point out of the plurality of access points, by carrying out a second procedure for establishing a new pairwise transient key for the end point subsystem and the candidate access point with the authenticator, and the host processor is further configured to provide the initial pairwise transient key to the controller for use as the pairwise transient key, when the end point subsystem does not have a secure connection.

To enable an electronic device or an end device to support higher data rate communication in view of IoT applications, optical wireless communication or Li-Fi is proposed as a complementary, or even replacing, technology to a wired connection or a radio-based wireless communication. An end point subsystem may be connected or communicatively coupled to such an end device as a separate entity or be partially or entirely integrated in the end device. The end device can be a smart phone, a tablet, a computer, a remote controller, a smart TV, a display device, a storage device, a home appliance, or another smart electronic device, which may already have one or more well-established communication interfaces in accordance with short range wireless communication protocols (Wi-Fi/BLE/Zigbee), cellular communication protocols (3G/4G/5G), or a wired communication protocol (Ethernet). It will be convenient that the same security infrastructure can be shared between a Li-Fi network and an existing, and more conventional, communication network. Thus, it is also preferred that a Li-Fi system follows a similar protocol for authentication and key-establishment as in the existing communication network.

Wi-Fi is one of the most widely used wireless communication technologies for local area networking. Wi-Fi networks are deployed almost everywhere, at home, in the office, in the bus, on the train, at the station, at the airport, at the stadium, and etc. Thus, it is advantageous to integrate a Li-Fi security infrastructure to an existing IT infrastructure, such as a Wi-Fi compliant IT infrastructure.

With the conventional 4-way handshake in a Wi-Fi system, to derive a pairwise transient key (PTK), two parties are involved, an authenticator and a supplicant. The authenticator may be comprised in one of the access points, or a central controller. The supplicant typically runs on a host processor of the end device or client device. Every time to derive a new PTK, the supplicant needs to use knowledge of a PMK, which is generated from a master session key. The host processor is a kind of central processor or main processor of an electronic device, which handles and executes instructions from a user and allocates certain tasks derived from instructions to other dedicated processors or controllers in the electronic device. Given that the host processor may perform many tasks, such as similar functionalities of an operating system, and it may also support one or more other communication interfaces other than Li-Fi, the information related to the PMK comprised in the host processor may not be always or timely available to the end point. One the other hand, the latency requirement involved in a handover procedure in the optical multi-cell network is critical. Hence, it is advantageous to introduce a second supplicant in the dedicated controller of the end point to speed up the key-derivation process.

The end point subsystem comprises a host processor that is configured to act as a first supplicant to carry out a first procedure for establishing an initial PTK. The host processor may be dedicated to the end point subsystem, and it may also be a same host processor shared with the end device that the end point subsystem is connected to, communicatively coupled to, or partially or entirely integrated in. The first procedure may be a conventional method for deriving a security key as in another communication system, such as a Wi-Fi 4-way handshake. The first procedure may also be a modified version as compared to the conventional method, similar to the second procedure as disclosed in the present invention, and one difference may be that the host processor makes use of a PMK to derive the initial PTK.

The communication or signaling exchange in the first procedure may be carried out via the same optical multi-cell wireless communication network. Alternatively, the first procedure may be carried out via another communication system (short range wireless communication, cellular communication, or Ethernet), as long as it is supported by the end device that the end point subsystem is connected to, or partially or entirely integrated in. With the first procedure, the initial PTK is obtained by the host processor. When the end point subsystem does not have a secure connection, the host processor is further configured to provide the controller with the initial PTK as an active PTK for use in protecting data communication on the optical link.

The controller of an end point may be a processor, one or more microprocessors, or a dedicated hardware, such as application specific integrated circuits (ASICs), and field-programmable gate arrays (FPGAs). Alternatively, the controller may also be a modem comprised in the optical transceiver.

The controller of the end point is configured to use a PTK to encrypt or decrypt data communicated on the optical wireless link. When the end point enters the area of the optical multi-cell wireless network, to set up a secure optical link for the first time the controller may use the initial PTK established by the host processor as an active PTK for use. However, in case that the initial PTK is established between the host processor and another access point other than the currently associated access point, the end point may use the second procedure, based on the knowledge of the initial PTK, to establish a new PTK with the currently associated access point to secure the optical link. Therefore, the end point may first establish an optical link with the associated access point without additional security measures, and then it may make use of the initial PTK provided by the host processor, which may be derived via another communication network and possibly with another access point in the other communication network, to derive a new PTK to secure the on-going optical link with the associated access point.

In order to prepare for a potential handover from the currently associated access point to the candidate access point, the controller is configured to act as a second supplicant to speed up the procedure to derive a new PTK or a new security key. Different from the host processor, the controller is more dedicated to the end point or the optical communication, which may be used mainly for handling key establishment and digital processing of the optical link, such as digital signal-conditioning, modulating, and demodulating. Thus, the controller of the end point may response more promptly to the operation related to the new key establishment, such as in the second procedure, as compared to the host processor.

Another advantage to use the controller as the second supplicant to prepare the new PTK for the candidate access point is that it may usually be necessary to keep the first procedure compliant to a conventional or standard method that is used by another communication interface supported by the end device, considering that the host processor may be shared with the end device that the end point is connected to, or partially or entirely integrated in. It is more flexible to define or customize a second procedure carried out by the controller that is dedicated to the optical communication to establish a new PTK in a prompt and efficient manner.

In one embodiment, the optical transceiver is further configured to receive information related to the candidate access point from either the currently associated access point or the candidate access point; and trigger the controller to initiate the second procedure upon the reception of the information related to the candidate access point.

Since the new PTK is established between the end point and a candidate access point, the information related to the candidate access point, such as a unique identifier of the candidate access point, may be received by the end point from the currently associated access point, or may be obtained from the candidate access point directly.

When there is a central controller, or a Li-Fi controller in the optical wireless communication network, such handover may be controlled in a centralized manner. The central controller or the Li-Fi controller has a good overview of the deployment of the plurality of access points and the association between the end point and a currently associated access point, based on which the central controller may also give a suggestion on a potential handover of the end point to a candidate access point next to the associated access point. The plurality of access points are typically connected to the central controller or Li-Fi controller with a high-speed and reliable backbone connection, which can be either a wired connection or a wireless connection. The end point may then receive such suggestion on a candidate access point from the central controller or Li-Fi controller via its currently associated access point.

It is also possible that the end point enters the overlapping area between the associated access point and the candidate access point. And then the end point may initiate the second procedure upon detecting a downlink communication from the candidate access point.

In a further embodiment, the information related to the candidate access point is a downlink advertisement received from the candidate access point.

In this example, the plurality of access points send out downlink advertisements to announce their presence, which may comprise their identification information. When the end point roams into the overlapping area of the currently associated access point and the candidate access point, the end point may figure out the existence of the candidate access point upon receiving such an advertisement, and start the second procedure to prepare a new security key or PTK for the candidate access point.

Advantageously, the optical transceiver is further configured to compare link qualities of optical wireless communication links with the currently associated access point and the candidate access point respectively; trigger the controller to start handover to the candidate access point based on the comparison on link qualities.

The actual handover moment may be determined by the end point itself based on its assessment on the link qualities with the currently associated access point and the candidate access point respectively. The handover can be either a hard handover or a soft handover. The hard handover means that at a certain moment the end point may only be associated to one access point. The soft handover indicates that the end point may be associated with both access points at the same time, and data communicated with the earlier associated access point and the candidate access point may even be combined.

Link quality is an indication of the quality of packets received on the link, which may be derived from a received signal strength. To estimate the link quality with the candidate access point before an actual handover, the end point may measure the received signal strength of the downlink advertisement from the candidate access point, or of another downlink communication overheard by the end point from the candidate access point. One criterion for the comparison of link qualities can be that the end point opts to build up an optical link with one out of the two access points, which has a better link quality. Another criterion can be that the end point will not hand over to the candidate access point as long as the link quality of the connection with the currently associated access point is not below a certain threshold. A further criterion can be that the end point hands over to the candidate access point when the link quality of the signals received from the candidate access point is above a certain threshold. Another further criterion can be that the end point maintains an existing link and builds up a new link simultaneously, as long as the link quality of the existing link and the new link are above a certain threshold, where a soft handover may take place.

In another embodiment, the pairwise transient key between the end point subsystem and the currently associated access point is used in the second procedure for establishing the new pairwise transient key.

As disclosed above, in a conventional system, the supplicant needs to use knowledge of a PMK to derive a new PTK. However, the information related to the PMK is usually comprised in the host processor and may not be always or timely available to the end point subsystem. Since the controller always has one PTK available or active when there is a secure optical connection of the end point subsystem, it is advantageous to use the active PTK that is directly available to the controller to derive the new PTK or new security key for a candidate access point in the second procedure, which reduces the chance of any additional latency resulted from acquiring a PMK.

In a preferred setup, the optical transceiver and the controller are comprised in a single housing, which is attached to a device comprising the host processor.

When the end point subsystem is connected to, communicatively coupled to, or partially integrated in a device/end device/mobile device, it is advantageous that the optical transceiver and the controller are comprised in a single housing, such as a dongle type of pluggable small device, while the host processor is a shared one comprised in the device/end device/mobile device. Thus, the establishment of the initial PTK may be handled by the device/end device/mobile device in a conventional method, such as via a Wi-Fi link, an Ethernet connection, or a cellular connection. As long as the Li-Fi dongle obtains the initial PTK for use by the optical link for a first time establishing a secure optical link, the customized second procedure can be adopted by the dongle to establish a new PTK independently without further interacting with the host processor of the device/end device/mobile device. This is because only the active PTK that is currently in use by the controller is used in the second procedure to derive the new PTK. Such a setup brings great system flexibility.

Alternatively, the optical transceiver, the controller and the host processor are comprised in a same single housing, and hence, the end point subsystem becomes an end point device. The host processor will be more dedicated to application level processing for the end point device, while the controller is dedicated to the optical communication related processing.

In accordance with a second aspect of the invention a system is provided. A system for supporting an end point subsystem according to claim 1 to carry out a secure handover from an access point currently associated with the end point subsystem to another access point out of a plurality of access points in an optical multi-cell wireless communication network, the system comprising: the end point subsystem; the plurality of access points, comprising the currently associated access point and the candidate access point, configured to perform optical wireless communication with the end point subsystem and to connect via a backbone connection with one another and/or with a central controller; an authenticator configured to carry out a first procedure with a first supplicant and a second procedure with a second supplicant, and wherein the first and the second supplicants are comprised in the end point subsystem.

Advantageously, it is disclosed that two supplicants are comprised in the end point subsystem. The first supplicant is comprised in a host processor, which is configured to establish an initial PTK or initial security key, via an optical wireless link as in the optical multi-cell network, or via another modality, such as a RF-based wireless link or a wired connection. The second supplicant is comprised in a controller, which may be dedicated for the optical wireless communication and can response more promptly to the needs to start the second procedure. Thus, the split of a single supplicant per client device or end device of a conventional system into a first supplicant and a second supplicant speeds up the procedure to establish a new PTK or new security key, which helps to fulfil a more seamless handover experience in the optical multi-cell wireless network by reducing latency incurred by the security key provisioning.

Note that the connection among the plurality of access points and the connection between an access point and a central controller is a backbone connection, which is a stable and high-speed link and in certain scenarios may even be an always-connected link. The backbone connection can be a wired connection, such as Ethernet, or a wireless connection based on radio frequency (RF) or millimeter-wave. The backbone connection can also be another kind of optical wireless link that is different from the one that an end point is performing in the optical multi-cell wireless network. Such an example can be free space optical communication.

In one embodiment, the authenticator is comprised in the central controller connected with the plurality of access points via backbone connections.

It is possible to deploy the authenticator in a central controller or Li-Fi controller as in a centralized approach. The plurality of access points is connected with the central controller or Li-Fi controller via backbone connections. Such centralized setup is a preferred option for a large optical multi-cell network with a large number of access points in the network but may be beneficial even in smaller systems. As disclosed above, a backbone connection is a stable and high-speed link and in certain scenarios may even be an always-connected link. Therefore, all the access points can reach the authenticator, which is comprised in the central controller, in a prompt and efficient manner via backbone connections.

With the centralized deployment of the authenticator, the second supplicant comprised in the end point may communicate with the authenticator via the currently associated access point, considering the established optical link between the end point and the currently associated access point and the backbone connection between the currently associated access point and the central controller. Therefore, the logical connection between the end point and the authenticator is ready for use.

In another embodiment, the authenticator is comprised in an access point out of the plurality of access points, and wherein the access point is configured to communicate with other access points out of the plurality of access points via backbone connections.

It is also possible to deploy the authenticator in one or more access points out of the plurality of access points as in a distributed approach, where the plurality of access points is connected to one another via reliable and high-speed backbone connections. Hence, the related one or more access points coordinate with each other to carry out the functions of the authenticator in a collective manner. The benefit of this distributed approach is that no dedicated central device or central controller is needed, and it is more flexible and convenient to implement. Therefore, this option is most preferred by a system with a small network scale, which saves the extra cost to deploy a dedicated central device or central controller.

However, when the network scales up, the complexity to coordinate the one or more related access points and the resource required for an individual access point to handle the authenticator function may also go up considerably. And hence, it may become less efficient as compared to the centralized approach. By providing authenticator function within one or more access points, a gradual network growth may be initially supported via the distributed approach. When the network scales to a certain size, a local authenticator function may be disabled by the related one or more access points, and correspondingly, a central controller or Li-Fi controller comprising a centralized authenticator may be added in the network to reduce the overhead for the related one or more access points.

Similar to the centralized approach, the second supplicant comprised in the end point may communicate with the authenticator via the currently associated access point. The logical link between the end point and the authenticator may comprise firstly optical ink between the end point and the currently associated access point, and secondly a backbone connection between the currently associated access point and another access point that the authenticator is located. If the currently associated access point also comprises an authenticator function, the second supplicant may communicate with the authenticator directly via the optical link.

Advantageously, the authenticator is further configured to provide the new pairwise transient key to the candidate access point.

No matter whether the authenticator is implemented in a centralized approach or a distributed approach, it is beneficial that the authenticator can provide the new pairwise transient key (PTK) to the candidate access point in a proactive fashion, such as upon the generation of the new PTK and before the handover actually takes place. It may also be possible that the authenticator will send the new PTK at a later stage just when the handover is about to take place or even shortly after the handover takes place, upon a notification received from the former associated access point or from the candidate access point.

In another example, the second procedure for new PTK establishment also triggers, or even comprises, a resource request to the candidate access point for allocating a resource (such as a time slot, a frequency channel, or a wavelength) to the end point for communication after handover. It may be preferred that the new PTK is provided to the candidate access point only when the resource allocation is allowed by the candidate access point. It may also be possible that the new PTK is provided anyhow to the candidate access point upon generation. Very often such PTK may have a certain lifetime or a validity period, and effectively only when the handover takes place within the new PTK's lifetime or validity period, the new PTK will be put to use. Otherwise, the pre-established new PTK will simply expire and be deleted by the controller.

In accordance to a third aspect of the invention, a method of an end point subsystem is provided. A method of an end point subsystem for performing a secure handover from an access point currently associated with the end point subsystem to another access point out of a plurality of access points in an optical multi-cell wireless communication network, the method comprises the following steps of the end point subsystem:

performing optical wireless communication;
securing an optical wireless communication link with the currently associated access point by using a pairwise transient key to encrypt or decrypt data communicated on the link;
acting as a first supplicant to carry out a first procedure for establishing an initial pairwise transient key with an authenticator for the end point subsystem;
acting as a second supplicant to prepare for a secure handover to a candidate access point out of the plurality of access points, by carrying out a second procedure for establishing a new pairwise transient key for the end point subsystem and the candidate access point with the authenticator;

providing the initial pairwise transient key to the controller for use as the pairwise transient key, when the end point subsystem does not have a secure connection.

As an example of one way to practice the invention, a first procedure may be a conventional procedure or a standard procedure that is carried out by the host processor as a first supplicant to establish an initial PTK, which may be, but not necessary, carried out via an optical link in the optical multi-cell network. Given that the host processor may be shared with the end device/mobile device and is not dedicated to the end point subsystem for optical communication, it may also be the case that the host processor has already established a secure link via another communication technology, either wired or wireless. To assist the end point subsystem to build up a secure optical link, the host processor will provide the initial PTK to the controller of the end point for use. When the initial PTK is established between the end point subsystem and the same associated Li-Fi access point, the controller will use the initial PTK directly to encrypt and decrypt data on the optical link with the associated access point. Otherwise, the controller will make use of the initial PTK to generate a new PTK for the associated access point via the second procedure. Therefore, whenever the end point has a secure optical link, the controller of the end point, which may be dedicated for signal processing and digital controlling of the optical communication, always has an active PTK in use. To prepare for a potential handover, it is advantageous that the controller as a second supplicant, on behalf of the end point, carries out a second procedure for establishing a new PTK for the end point and the candidate access point by using the active PTK in the second procedure. Therefore, in the second procedure, there is no further interaction with the host processor to obtain a PMK in order to derive the new PTK, as in a conventional approach. Furthermore, given that the controller is more dedicated to the optical communication and is timely ready for operations related to the optical communication, employing the controller, instead of the host processor, as the supplicant on behalf of the end point, helps to further reduce the additional latency introduced by security key provisioning. It is preferred that the second procedure is carried out before the handover actually takes place. With the new PTK ready for use, the optical link between the end point and the candidate access point can be protected in a secure mode from the beginning.

Preferably, the second procedure comprises the following steps of the second supplicant:
 sending to the authenticator a request comprising at least a first nonce, a first frame counter, and a first message integrity code derived based on the pairwise transient key;
 receiving from the authenticator a confirmation comprising at least a second nonce, a second frame counter, and a second message integrity code derived from the new pairwise transient key;
 extracting the second nonce from the confirmation received;
 deriving a local new pairwise transient key based on the second nonce extracted;
 generating a local message integrity code based on the locally derived new pairwise transient key;
 verifying the second frame counter and the second message integrity code against the first frame counter and the local message integrity code;
 adopting the locally derived new pairwise transient key as the new pairwise transient key, upon successful verification of both the second frame counter and the second message integrity code.

As compared to a conventional 4-way handshake in a Wi-Fi system, the second procedure carried out by the second supplicant is a customized handshake to derive a new PTK for a potential handover in the optical multi-cell wireless network. As disclosed above, the second procedure may be triggered by the front end of the end point itself upon detection of a downlink communication of the candidate access point, and it may also be triggered by a message about the candidate access point received from a central controller via the currently associated access point. With information related to a candidate access point available, the second supplicant may trigger a new session key or a new transient key establishment handshake.

The communication between the second supplicant and authenticator is via a logical link between the end point subsystem and the authenticator, which may be comprised in a central controller or Li-Fi controller or in one or more access points. Therefore, the logical link between the end point subsystem and the authenticator may comprise more than one physical link, such as firstly an optical link between the end point subsystem and the currently associated access point, and secondly a backbone connection between the currently associated access point and the central controller or another access point that the authenticator function is located.

To secure a request message sent to the authenticator, the handshake makes use of an active PTK of the end point, which may also be the initial PTK when the end point first time tries to handover in the optical network. The request comprises at least a first nonce, a first frame counter, and a first message integrity code (MIC) derived based on the active PTK. The first nonce is a cryptographic nonce generated by the second supplicant. The first frame counter is a kind of count bit/bits or number to indicate the sequence of messages sent by a certain sender, which is employed by a receiver to detect losses or duplication of frames/messages. The first MIC is calculated for the request message using the active PTK that is currently held by the second supplicant. Optionally, the request may also comprise a unique identifier of the candidate access point, which may depend on whether the candidate access point is detected by the end point itself. The request is then sent by the second supplicant via the currently associated access point to the authenticator. Upon successful delivery of the request from the second supplicant, the second supplicant may receive a confirmation from the authenticator via the currently associated access point. The confirmation from the authenticator is constructed in a similar format of the request message, which comprises at least a second nonce, a second frame counter, and a second message integrity code derived from the new pairwise transient key. With the confirmation received, the second supplicant can then extract the second nonce from the authenticator. With the first nonce, the second nonce, and the active session key of the end point, the second supplicant can derive a local new PTK. In order to verify the second nonce comprised in the confirmation message, the second supplicant will generate a local message integrity code, and to compare the local message integrity code against the second message integrity code comprised in the confirmation message. The local message integrity code is generated with the locally derived new PTK and the plain text in the confirmation message, such as the second nonce and the second frame counter. If the second frame counter is not out-of-date and the locally generated message integrity code also matches the second message integrity code comprised in the confirmation message, the second supplicant can then make sure the locally derived new PTK is correct and ready for use.

In accordance to another aspect of the invention, a method of an authenticator is provided for supporting an end point subsystem to carry out a secure handover from an access point currently associated with the end point subsystem to another access point out of a plurality of access points in an optical multi-cell wireless communication network, the method comprises the steps of the authenticator:

carrying out a first procedure with a first supplicant comprised in the end point subsystem, for establishing an initial pairwise transient key for the end point subsystem, when the end point subsystem does not have an established secure connection, and carrying out a second procedure with a second supplicant comprised in the end point subsystem for establishing a new pairwise transient key for the end point subsystem and a candidate access point out of the plurality of access points to prepare for a secure handover of the end point subsystem to the candidate access point.

The first procedure is triggered when the end point subsystem does not have an established secure connection. An established secure connection may not be an active link, but it does indicate that a pairwise transient key is available to the two related parties of the connection to secure data exchange between the two parties when necessary.

The authenticator function may be implemented in a centralized manner, such as being comprised in a central controller, or in a distributed manner, such as being comprised in one or more access points. The authenticator function may also comprise a mix of the first procedure to derive a PTK in a conventional way and the second procedure to derive a PTK as disclosed in this invention. It is also possible that the first procedure is the same as the second.

In a preferred setup, the second procedure comprises the following steps of the authenticator:

receiving from a second supplicant a request comprising at least a first nonce, a first frame counter, and a first message integrity code;

verifying the first frame counter and verifying the first message integrity code based on the pairwise transient key;

extracting the first nonce upon successful verification of the first frame counter and the first message integrity code;

deriving the new pairwise transient key based on the first nonce extracted;

sending to the second supplicant a confirmation comprising at least a second nonce, a second frame counter, and a second message integrity code derived based on the new pairwise transient key;

informing the candidate access point about the new pairwise transient key.

In the second procedure, the authenticator acts as a counterpart of the second supplicant during the handshake. In the request received from the second supplicant, the authenticator can first check is the request is not out-of-date based on the first frame counter. Since the authenticator has the information of the active PTK of the end point, the authenticator can derive a local message integrity code based on the request received and the knowledge of the active PTK of the end point. Upon successful verification, the authenticator will then extract the first nonce from the request. Based on the information of the first nonce of the end point, a second nonce generated by the authenticator itself, and the active PTK of the end point, the authenticator can derive a new PTK. The authenticator then compiles a confirmation message to the second supplicant, which comprises at least the second nonce, a second frame counter, and a second message integrity code generated with the new PTK.

The authenticator may have knowledge of the candidate access point via a central controller or a Li-Fi controller, or via another access point. The authenticator may also obtain the information related to the candidate access point in the request sent by the second supplicant. Thus, the authenticator may inform the candidate access point about the new PTK upon the generation of the new PTK.

It may also happen that the authenticator is comprised in the candidate access point. In that case the associated access point or the Li-Fi controller forwards the request from the second supplicant to the candidate access point. And then, the authenticator comprised in the candidate access point generates the new PTK. As a result of that, the candidate access point obtains the new PTK directly from the local authenticator.

The invention may further be embodied in a computer program comprising code means which, when the program is executed by an end point subsystem or an authenticator comprising processing means, cause the processing means to carry out the method of the end point subsystem and the authenticator.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

FIG. 9 schematically depicts basic components of an end point subsystem of the present invention, when the host processor is shared with an end device/mobile device that the end point is connected to, communicatively coupled to or partially integrated in;

FIG. 10 schematically depicts basic components of an end point subsystem of the present invention, when the host processor is shared with an end device/mobile device that the end point is fully integrated in;

DETAILED DESCRIPTION OF EMBODIMENTS

Figure 1:
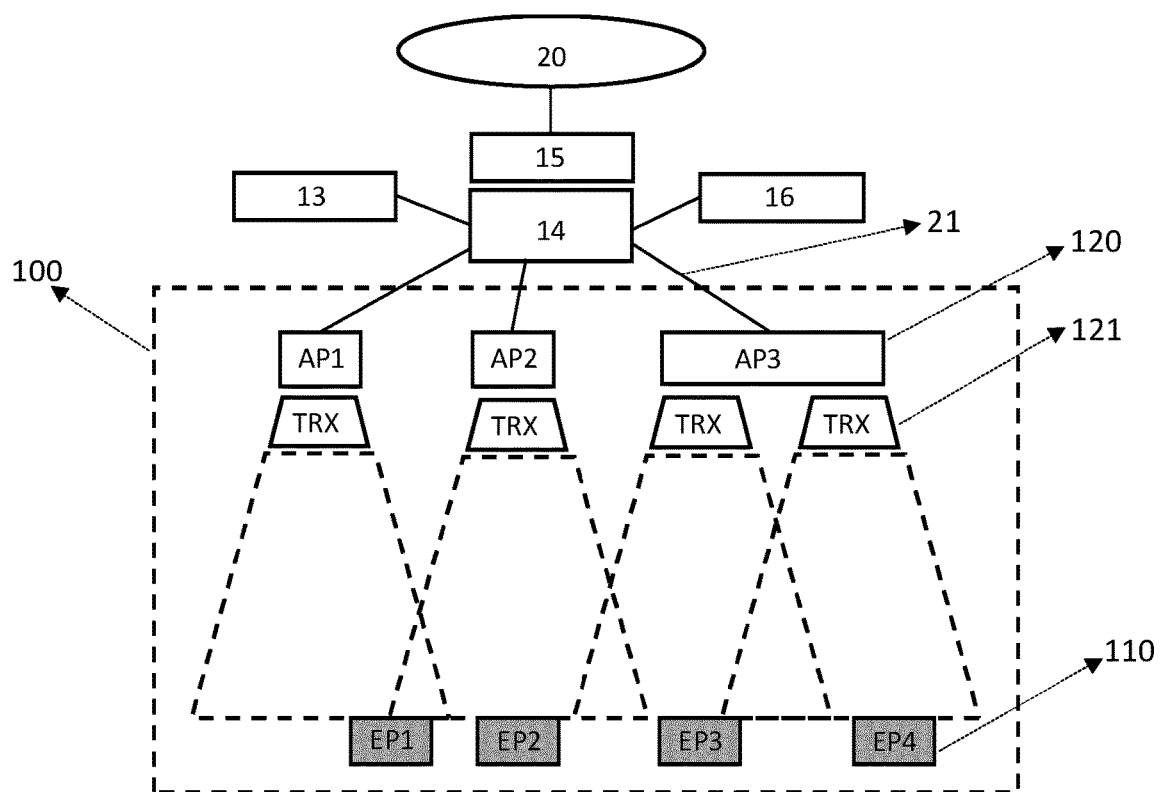
FIG. 1 demonstrates an overview of the OWC network, and the backbone network connected to it.

Various embodiments of the present invention will now be described based on an optical wireless communication (OWC) network system 100, or more specifically a Li-Fi network system, as shown in FIG. 1. For illustration purposes, the Li-Fi network 100 is connected to a backbone network 20 via an IP router 15 and an Ethernet switch 14, while in a practical system more routers and switches may be deployed to connect the backbone network to the Li-Fi network. Note that the Ethernet switch 14 and the IP router 15 are also part of the backbone network. The symbol of the backbone network 20 in FIG. 1 is for illustration purpose, which should be considered as the rest part of the backbone network apart from the Ethernet switch 14 and the IP router 15 shown in the figure. In this example, the connection between the Li-Fi network and the backbone network is called a backbone connection 21. The backbone connection is a stable and high-speed link, which can be a wired connection, such as Ethernet, or a wireless connection based on radio frequency (RF) or millimeter-wave. The backbone connection can also be another kind of optical wireless link that is different from the one that an end point is performing in the optical multi-cell wireless network. One example of the other kind of optical wireless link can be free space point-to-point optical links.

Li-Fi System Overview and Network Architecture

As a wireless communication technology for local area networking, Li-Fi plays a similar role as Wi-Fi to provide the last tens of meters connectivity. A Li-Fi network 100 may comprise a plurality of optical access points (APs) 120 and network devices or end points (EPs) 110. Each end point 110 is selectively associated to and synchronized with a respective one of the access points 120. A Li-Fi AP 120 may be connected to one or multiple optical front ends or Li-Fi transceivers (TRX) 121, for providing access to Li-Fi devices or Li-Fi end points (EPs) 110. The trapezoids shown in dash lines illustrate field-of-views (FoVs) or coverage of individual Li-Fi transceivers 121. Only when an EP 110 is located in the coverage of a Li-Fi AP 120, will it be able to receive a downlink communication from that AP 120. By assuming symmetrical up and down links of the optical communication, a bidirectional optical link can be built up under the same condition. Because of the line-of-sight character of the optical communication link, adjacent access points 120 do not have a direct optical link amongst each other, whereas an end point 110 located in the overlapping area of the coverage of adjacent access points 120 is able to detect optical signals from both access points.

In one example, a Li-Fi AP 120 may also operate as a domain master with additional functionalities according to G. hn, ITU G.9960 and G.9961, to manage several Li-Fi EPs 110. In one implementation, handover happens when an EP roams from one domain to another. In another implementation, each Li-Fi AP 120 is operated as a domain master managing an individual domain hosting multiple Li-Fi EPs, which can be up to 255 Li-Fi EPs. Such Li-Fi APs 120 are typically located on the ceiling. They may, but not necessarily, be collocated with luminaires, especially when the communication is not based on visible light. The main functions of a Li-Fi AP 120 may include to advertise the presence of an AP 120 to Li-Fi EPs 110 in the surroundings, to register and deregister Li-Fi EPs 110, to provide medium access control (MAC) scheduling among associated Li-Fi EPs 110, to collect interference reports from EPs 110, to adjust local schedule in response to interference reports, and/or to report neighboring relations to the Li-Fi controller 13. Some of the functions of the Li-Fi AP 120, such as MAC scheduling for interference avoidance, may be implemented by the Li-Fi controller 13 in a centralized manner.

Li-Fi EPs or Li-Fi devices 110 are end user modems that facilitates end devices to connect to the Li-Fi network 100. Nowadays, a Li-Fi EP 110 is typically a dedicated entity connected to a laptop or other end devices. In the future, a Li-Fi EP 110 may be partially or fully integrated to a smart phone, a tablet, a computer, a remote controller, a smart TV, a display device, a storage device, a home appliance, or another smart electronic device.

There may be a L-Fi controller or central controller 13 connected to the plurality of access points 120 in the Li-Fi network 100. The Li-Fi controller or central controller 13 is in charge of controlling the Li-Fi system in a centralized manner when necessary, such as deriving information about the topology and neighboring relationship, deciding scheduling among different Li-Fi access points (APs) for interference suppression. Furthermore, Li-Fi controller 13 may also be employed to provide a user interface that allows a user or admin, such as an IT manager, to configure schedules among multiple Li-Fi APs, monitor reports from these Li-Fi APs, and/or to derive further statistic information about the system performance. It is typically ensured that there is only one Li-Fi controller 13 is visible to an individual AP, which is achieved by means of network configuration so that traffic to and from a Li-Fi controller 13 is isolated inside its own network segment, via virtual LANs (VLANs) or similar. Furthermore, a protocol, such as a Control and Provisioning of Wireless Access Points (CAPWAP) protocol, can be used to discover multiple controllers and to select one controller that has free resources to host/manage an access point joining an infrastructure.

In one exemplary implementation of the Li-Fi system, a Li-Fi synchronization server 16 is connected to the system, which is in charge of synchronizing (or aligning) the G.v1c medium access control (MAC) cycles of the different G.v1c domains. This is needed to align some common time slots for detecting neighboring APs 120 and avoiding interference to an EP 110 located in the overlapping area of neighboring APs 120. Because of the line-of-sight characteristic of an optical link, neighboring APs 120 typically cannot detect the signals from one another directly. However, an EP 110 located in the overlapping area of two neighboring APs 120 may experience interference if the neighboring APs 120 are transmitting simultaneously. To avoid such situation, it may be necessary to keep adjacent APs 120 synchronized to a common time base, and to prevent them to transmit at the same moment. One preferred option for network synchronization is to employ the Precision Time Protocol (PTP), IEEE 1588v2. The PTP provides a sub-microsecond accuracy, which is fair enough for inter G.v1c domain MAC alignment. To keep the PTP accuracy, support from Ethernet switch is necessary, which should also be PTP capable. To keep the PTP accuracy, any element in the Ethernet network must handle PTP so the switch selected for any deployment must support and be configured to operate in the PTP mode accordingly.

It may also happen that a Li-Fi system is to be deployed in a legacy system where PTP is not supported by the existing infrastructure. And hence, additional measures should be taken to synchronize neighboring APs 120 in a different and maybe sub-optimal manner, and accordingly a solution should be found for an EP 110 to deal with the non-ideal synchronization among neighboring APs 120.

Detailed System Description

Li-Fi AP

Figure 2:
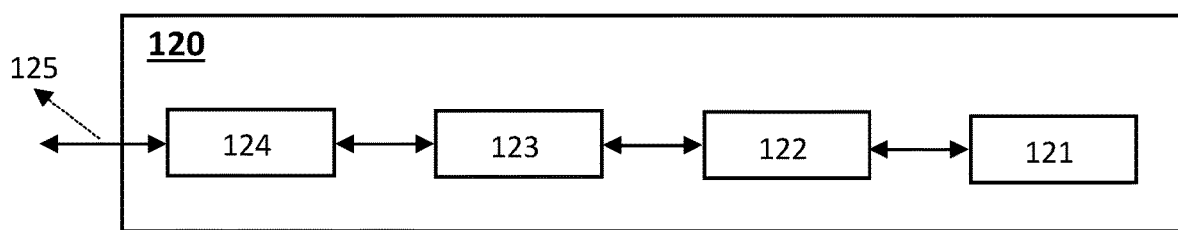
FIG. 2 schematically depicts basic components of a Li-Fi access point.

A Li-Fi AP 120 is a key unit to establish a Li-Fi network 100. In some scenarios, a Li-Fi AP 120 also forms the interface between an existing IT infrastructure and a Li-Fi network 100. A high-level block diagram of a Li-Fi AP 120 is shown in FIG. 2. On one side, the Li-Fi AP 120 has an interface 124 to a backbone network, which can be a wired connection (Ethernet), or a wireless connection (RF, millimeter-wave, or another kind of optical wireless that is different from the one a Li-Fi EP is performing). And on the other side, the Li-Fi AP 120 has an optical front end 121 to enable the optical link with one or more Li-Fi EPs 110. Furthermore, the Li-Fi AP 120 also carries out the function to implement bi-directional translation or conversion between the data on the backbone network 20 and data on an optical link, in terms of conversion between different modulation schemes and conditioning of the analog signals. Therefore, a Li-Fi AP 120 comprises at least also a digital modulator or demodulator component 123 and an analog front end 122. In the transmission path, the analog front end (AFE) 122 may comprise a programmable amplifier, a filter, and a driver to condition and amplify the baseband signal to drive the optical front end. For the receiving path, the AFE 122 may comprise an attenuator, a low noise amplifier, a filter and a programmable gain amplifier to accommodate the received signals for the further digital processing.

The optical front end 121 comprising at least a light source and a light sensor implements the conversion between electrical signals and optical signals. In the transmitter chain, the optical front end 121 is used to convert the electrical transmitting signals to output optical signals via the light source. In the receiver chain, the optical front end 121 is used to convert the received optical signals to output electrical signals via the light sensor for further signal processing. The optical front end 121 is also called Li-Fi transceiver (TRX), such that:

Li-Fi transmitter (Tx): transforms an electrical signal obtained from the AFE to an optical signal (e.g. to be emitted by an LED), and Li-Fi receiver (Rx): transforms a received optical signal (e.g. from a photodiode) to an electrical signal for the AFE.

Figure 3:
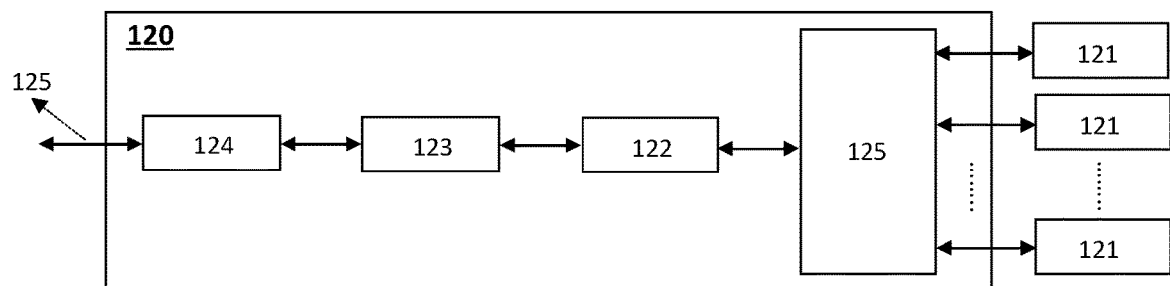
FIG. 3 schematically depicts basic components of a Li-Fi access point with multiple optical front ends.

A Li-Fi AP 120 may be connected to a single Li-Fi TRX 121, or multiple Li-Fi TRXs 121, which allows to transmit the optical signals over different optical paths. In case a Li-Fi AP 120 is connected to multiple Li-Fi TRXs 121, the Li-Fi AP may handle them as one coherent signal, or as (partially) separate incoherent signals for establishing a communication link. FIG. 3 shows an example of a Li-Fi AP 120 with multiple Li-Fi TRXs 121. A Li-Fi interface component 125 is adopted to split or combine the data sent to or received from the multiple Li-Fi TRXs 121.

Li-Fi EP

Figure 4:
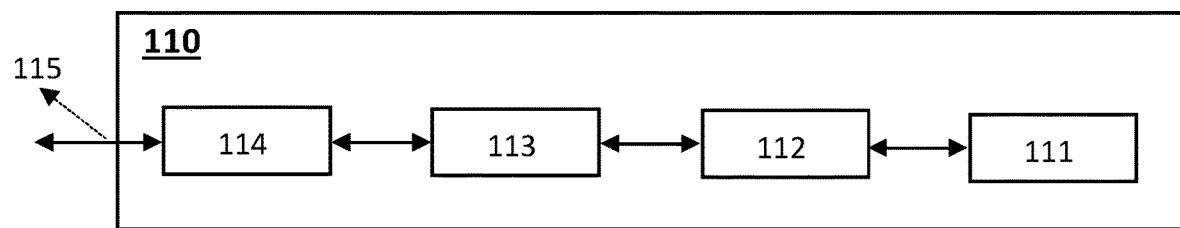
FIG. 4 schematically depicts basic components of a Li-Fi end point.

A high-level overview of a Li-Fi EP or a Li-Fi device 110 is shown in FIG. 4. Similar to a Li-Fi AP 120, a Li-Fi EP 110 comprises at least an optical front end 111, an analog front end 112, a digital modulator/demodulator 113, and an interface 114 to the end device or a processor.

A Li-Fi EP 110 may be connected to an end device as a separate entity via a cable or be partially or entirely integrated in the end device. For many end devices, such as laptop, smart phone, remote controller, Ethernet is a well-established interface in the operating system of the end devices. Li-Fi may also be used to provide communication interface to the end device in addition or instead. To simplify the system integration of a Li-Fi EP or Li-Fi device to the operating system of an end device, it is advantageous to employ Ethernet over USB. Therefore, in one option, the Li-Fi EP or Li-Fi device 110 can be connected to the end device via a standard USB cable or plug. With the example of using Ethernet over USB, a Li-Fi EP 110 may comprise the Ethernet over USB interface 114 and connect to the end device via a USB cable 115. A Li-Fi EP 110 may also be connected to one or more client optical TRXs 111, same as in a Li-Fi AP 120. Alternatively, a single optical frontend that has segmented transmitters/receivers where each transceiver/receiver is directed in a different respective direction is also envisaged.

In another example, a different interface 114 may be used to connect the Li-Fi EP to the operation system of the end device, and the corresponding interface 114 (Ethernet over USB) and/or the cable 115 should be replaced accordingly.

Figure 5:
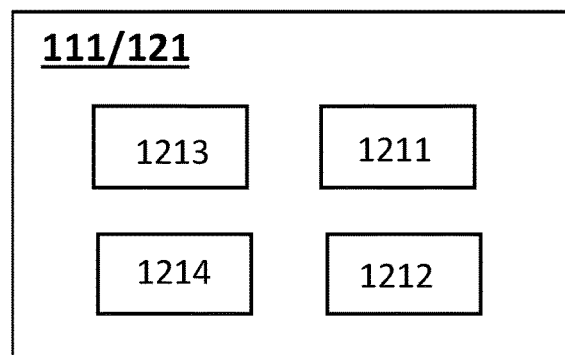
FIG. 5 schematically depicts basic components of an optical front end comprised in a Li-Fi access point or a Li-Fi end point.

FIG. 5 provides exemplary components of an optical front end or optical TRX 111,121 comprised in or connected to a Li-Fi AP 120 and a Li-Fi EP 110. An optical TRX 111, 121 comprises at least a light source 1211, a light sensor 1212, a driver 1213, and an amplifier 1214. The light source 1211 is used to convert the electrical transmitting signals to output optical signals, which can be a Light-emitting diode (LED), a Laser diodes (LD), or Vertical Cavity Surface Emitting Laser (VCSEL). The light sensor 1212 is used to convert the received optical signals to output electrical signals, which can be a photodiode, an avalanche diode, or another type of light sensor. The driver 1213 is mainly used for regulating the power required for the light source 1211. The amplifier 1214 is mainly used to condition the received signals by the light sensor 1212 to make the signals suitable for further processing in the electrical circuits. In one example, the amplifier 1214 can be a transimpedance amplifier (TIA), which is a current to voltage converter implemented with one or more operational amplifiers. TIA may be located close to the receiving light sensor or photodiode 1212 to amplify the signal with the least amount of noise.

Inter-Connection in a Li-Fi System

Typically, Li-Fi APs 120 are deployed on the ceiling. And such APs 120 need to be powered first in order to carry out communication activities. Therefore, the connections to the APs 120 are meant for both power and data. An AP 120 sets up bidirectional link with the cloud, or the backbone network 20 at one side via the backbone connection 21, and at the other side the AP 120 communicates with one or more associated EPs 110 via optical links. An EP 110 typically obtain power from the end device that the EP is coupled to or integrated in and communicates with an associated AP 120 via an optical link.

Connecting a Li-Fi AP to the Backbone Network

Different options can be taken for a Li-Fi AP 120 to get connected to the backbone network 20.

In one aspect, data and power may be jointly delivered to a Li-Fi AP, which can be implemented via a single power cable with power line communication (PLC) or a single Ethernet cable with power over Ethernet (PoE).

PLC makes use of the existing power line cables, i.e. for providing a device with mains power, also for data communication. Popular PLC communication standards, such as HomePlug® or G.hn, utilize Orthogonal Frequency Division Multiplexing (OFDM) technology, which is also widely adopted in a Li-Fi system. Hence, the physical layers (PHY) of a PLC system and a Li-Fi system may be quite similar, such as the modulation methods and the synchronization methods used in both systems. However, transmission in the optical domain are unipolar whereas in general OFDM uses bipolar signals. As a result, some adaptation may be required for transmission in the optical network. A simple solution is the use of a DC-offset which does not require demodulation and subsequent remodulation of an OFDM based PLC signal prior to optical transmission, or alternatively demodulation and subsequent remodulation using unipolar OFDM modulation techniques such as ACO-OFDM, DCO-OFDM, ADO-OFDM and/or Flip OFDM. Therefore, it may be quite convenient for a Li-Fi AP 120, which is typically collocated with the luminaire on the ceiling, to make use of the existing power cable to obtain also the data connection to the backbone network 20.

However, it is also recognized that the channel of a PLC system is quite noisy, given that the mains power line may act as an antenna to pick up all kinds of undesired signals that may interfere with communication signals that are also present on the mains power line. It is thus important for the Li-Fi over PLC enabled devices to cope with such external interference. Furthermore, a communication signal over a mains power line experiences an amount of attenuation that cannot be predicted during manufacturing and may vary over the day. The impact factors include the length of the cable that varies from building to building, that power loads that form more or less a short circuit for high frequencies and be switched on or off, etc.

A known solution to address the problems introduced by a PLC system on signal integrity is to equip an Li-Fi over PLC enabled device with a PLC decoder for decoding a PLC communication signal received over the mains power line. Impairments on communication signals are handled digitally. For instance, a narrowband interferer causes error on just single subcarrier of an OFDM modulated signal. The reconstructed data may be corrected using error correction algorithms. Subsequently, the reconstructed data is then transformed back to the analog domain for modulating the LED current flowing to the at least one LED. In such a way, a more robust operating device can be provided wherein the loss of data is reduced, although one of the drawbacks of this solution is that the device gets large in size, complex, costly.

On the other hand, if power can be delivered via an Ethernet cable, it may also be convenient for a Li-Fi AP to make use of existing IT infrastructure to obtain both power and connection to the backbone network 20. Power over Ethernet (PoE) is described in the IEEE802.3af/at standard and is currently being extended towards 4-pair power in the IEEE Task Force P802.3bt. PoE is intended to supply power voltage levels of 40 V to 48 V from Power Sourcing Equipment (PSE) to Powered Devices (PDs), alongside data lines for control and communication purposes. A PSE device is also referred to as PoE switch. In PoE lighting systems PDs may be light sources, user interface devices and sensors. The PSE is typically powered from a mains power source, such as according to the IEC/TR 60083 standard. Traditional PoE systems will transport data and power over a network and its end points, hence among PSEs and PDs.

Data can therefore be received by the control device, e.g., via Ethernet connection using the Ethernet Protocol. Data is communicated via the Ethernet Protocol between devices in power over Ethernet systems. Therefore, a microchip in form of an Ethernet controller can be used to establish a communication link between the devices, which supports Media Access Control (MAC) and physical layer (PHY) of the Open Systems Interconnection model (OSI model).

An Ethernet connection can for example be an optical fiber, an electric wire or a twisted pair cable, such as a Cat 3 cable, Cat 4 cable, Cat 5 cable, Cat 5e cable, Cat 6 cable, Cat 6A cable, Cat 7 cable, Cat 7A cable, Cat 8 cable, Cat 8.1 cable, or Cat 8.2 cable. The Ethernet connection can have several pairs of cables, e.g., 2, 3, 4, or more pairs of cables. The cables can be unshielded or shielded, in particular individually or overall shielded. The power and data can be transmitted via the same fiber, wire, or cable of the Ethernet connection or via different fibers, wires, or cables of the Ethernet connection. In case of transmission of power via an optical fiber the power can be transmitted in the form of photons that can be received by a solar cell unit of the data receiving device.

The data receiving device in a PoE system can comprise one or more ports. Each of the ports can comprise one or more pins. A pin can be configured for receiving power, data or power and data. Additionally, or alternatively, the port can also comprise one or more solar cell units for receiving power in the form of photons. As the ports can receive power and data via the Ethernet connection some of the pins can be supplied with power, while other pins are supplied with data via the Ethernet connection. Alternatively, or additionally, a pin can also be supplied with power and data via the Ethernet connection.

In another aspect, data and power may be separately delivered to a Li-Fi AP, and the options can be either via both a power cable and an Ethernet cable (wired connection to a backbone network), or a combination of a power cable and a wireless link to the backbone 20 (optical wireless links or free space optical link).

Preferably, a Li-Fi system may be integrated to an existing wireless communication system, such as a Wi-Fi system or a cellular system. And hence, a Li-Fi AP 120 may be integrated to or directly-connected a Wi-Fi access point or a cellular base station. By having a conversion or translation of signals between the Li-Fi AP 120 and the Wi-Fi access point or the cellular base station, the existing infrastructure of a Wi-Fi system or cellular system can be employed to provide the connection to the backbone network 20 for the Li-Fi AP 120.

Connecting a Li-Fi EP to a Li-Fi AP

A Li-Fi EP 110 gets access to a Li-Fi system via a Li-Fi AP 120, and the associated Li-Fi AP 120 is often called a local AP. There are several aspects to be considered for the connection between a Li-Fi EP 120 and a Li-Fi AP 110:

Coverage: a Li-Fi EP may not always be able to see a Li-Fi AP depending on its location, its orientation, the positioning of the Li-Fi APs, and the size of the Li-Fi EP's transducer/sensor coverage area.

Downlink interference: a Li-Fi EP that is in the overlapping coverage area of multiple optical downlinks experiences interference if these Li-Fi APs transmit at the same time.

Uplink interference: A Li-Fi EP that transmits a signal to an associated Li-Fi AP while another Li-Fi EP is transmitting to this same Li-Fi AP results in uplink interference at the Li-Fi AP.

Handover: Because of the mobility of a Li-Fi EP, a handover is needed when a Li-Fi EP moves from the coverage area of one Li-Fi AP to a neighboring Li-Fi AP. That is to say, when a Li-Fi EP (such as connected to or comprised in a user device, a client device, a mobile phone, etc.), moves from the current cell to the neighboring cell, then any active communication must be handed over to the node or access point of that neighboring cell. Handovers are intended to be made as quickly as possible in order to reduce disruption to any ongoing communication or data transfers and may include a preparation period in order to facilitate this. When insufficient time is available to prepare and establish a link to the new Li-Fi AP before the link with the existing Li-Fi AP is broken, the Li-Fi EP may experience a period in which it has no connection. Considering the relatively small size of a Li-Fi cell due to the line-of-sight character of the optical link, seamless handover is important to guarantee the link quality and the user experience.

Basically, a Li-Fi EP 110 can be connected to a Li-Fi AP 120 via bidirectional optical link, or a hybrid downlink and uplink. Note that here the downlink stands for the communication link from the Li-Fi AP 120 to the Li-Fi EP 110, and the uplink stands for the communication link from the Li-Fi EP 110 to the Li-Fi AP 120. A bidirectional optical link enables a relatively symmetrical connection between the Li-Fi EP 110 and the Li-Fi AP 120. Hence, both downlink and uplink enjoy the same advantages of Li-Fi communication as addressed above. However, in some application scenarios, such as for web-surfing or video streaming, the link between a Li-Fi AP and a Li-Fi EP can also be a hybrid link, which is a combination of an optical downlink from the Li-Fi AP 120 to the Li-Fi EP 110 and a radio frequency (RF) uplink from the Li-Fi EP 120 to the Li-Fi AP 110. The RF link may be in accordance with a popular short-range wireless communication protocol, such as Wi-Fi, BLE, or Zigbee, or be in accordance with a cellular communication protocol, such as 4G or 5G cellular.

Referring back to the options that the Li-Fi AP 120 may be built via a combo device supporting both Li-Fi AP function and Wi-Fi access point or cellular base station function, such hybrid link can be handled seamlessly by a controller at the Li-Fi AP side. Since a Li-Fi EP 110 is typically connected or integrated to an end device, which can be a smart phone, a tablet, a computer, or another smart device, the end device may already have the hardware support for the short range wireless communication protocol or cellular protocol used in the hybrid link. Therefore, such hybrid link also leverages the existing resource of the end device and provide a simplified solution for the Li-Fi EP, which only requires a receiving path, but not a transmitting path. The cost, power consumption, and form factor of the EP 110 may be further reduced in such a manner. Correspondingly, the Li-Fi AP 120 is also simplified by comprising mainly an optical transmitter to send data to the Li-Fi EP 110 via an optical downlink, whereas the RF-based uplink from the Li-Fi EP 110 to the AP 120 may be received by leveraging the RF receiver in the combo device or co-located Wi-Fi access point/cellular base station, or via a dedicated RF receiver comprised in the Li-Fi AP 120 itself.

Scheduling and Interference Suppression within an Optical Multi-Cell Wireless Network When there are multiple Li-Fi APs 120 deployed next to each other or when there are multiple EPs 110 associated to the same local AP 120 or to adjacent APs 120, medium access control (MAC) become necessary for an interference free optical communication. Different MAC mechanisms are possible to be employed in the optical multi-cell wireless network, such as time-division multiple access (TDMA), frequency-division multiple access (FDMA), carrier-sense multiple access (CSMA), code division multiple access (CDMA), space-division multiple access, or a combination of one or more aforementioned mechanisms. TDMA is based on time-division multiplexing scheme, where radio resource is scheduled in time domain and different time slots are assigned to different transmitters in a typically cyclically repetitive frame structure or MAC cycles. FDMA is based on frequency-division multiplexing, where different frequency bands are allocated to different devices for simultaneous transmission. And in optical communication, FDMA can also be evolved into wavelength division multiple access (WDMA), which is based on wavelength-division multiplexing. Another advanced version of FDMA is orthogonal frequency-division multiple access (OFDMA), where each device may use one or more subcarriers out of the entire band. OFDMA has more flexibility in providing different data rates or quality of service to different users, and in the meanwhile a high resource efficiency can be maintained despite of such diversity. CSMA typically employs "listen-before-talk" approach, where a device verifies the absence of any other traffic before transmitting on a shared medium. CSMA is widely used in a sparse network, and when the density of nodes scales, further collision-avoidance techniques come into place. CDMA is typically built on top of spread spectrum, and a common form is direct-sequence CDMA that is based on direct-sequence spread spectrum, where different devices send messages simultaneously with different spreading codes that are orthogonal to each other. Given the typically smaller FoV of an optical link as compared to a radio link, space-division multiple access may also be a very attractive solution here.

In a TDMA-based multi-cell network with multiple APs 120, due to the lack of direct communication, adjacent APs 120 sometimes may not have synchronous MAC cycles. Although the durations of one MAC cycle or super frame is typically the same for all the APs 120 in the network, the start times of MAC cycles can be different for individual APs 120. Note that the start time of a MAC cycle is used by an AP as a local time reference to divide the wireless medium into consecutive time slots. Such an offset of MAC cycles among two adjacent APs 120 may cause interference to an EP 110 located in the overlapping coverage areas of these two adjacent APs 120, even when a time slot is allocated exclusively to one AP 120 for communication with the EP 110 in the overlapping area. Therefore, it may be necessary for the APs 120 to synchronize to a common time base. The common time base may be obtained via synchronization handshake, via a reference clock distributed over the network (such as synchronous Ethernet clocks), or via a dedicated synchronization server in the network, or derived from a common signal, such as the zero crossing of the mains power. However, due to an uncertain delay in the network or an interference, there may still be timing synchronization uncertainty of the APs against the timing reference. It may still be necessary for an EP 110 located in the overlapping area of at least two adjacent APs 120 to derive timing information related to MAC cycles of the at least two APs 120 based on downlink communication from these APs, which can be either a normal data communication link or an out-of-band signaling message. Then, based on the derived timing information related to MAC cycles of the at least two APs 120, the EP 110 may further assist at least one out of the two adjacent APs 120 to adjust its MAC cycles to get aligned with the other.

Fast Secure Handover

For a Wi-Fi system, IEEE 802.11 defines that the communication for a handover or transition may be conducted directly with the neighboring access point, e.g., on a direct path (i.e. "over-the-air") or via the local access point of the distribution system (DS) (i.e. "over-the-DS"). In addition, the EP may want the neighboring access point to reserve resources prior to the transition, e.g., based on a fast transition (FT) resource request protocol according to section 13 of the IEEE 802.11 (2016) specification (Fast BSS transition). To this end, two FT protocols are defined. These are an FT protocol which is executed when a transition to a target access point is made and a resource request is not required prior to the transition, and an FT resource request protocol which is executed when a resource request is required prior to the transition. For a fast transition/handover of an EP from its currently associated access point to a target access point utilizing the FT protocols, message exchanges may be performed using the over-the-air approach (where the EP communicates directly with the target AP using an IEEE 802.11 authentication with an FT authentication algorithm) or the over-the-DS approach (where the EP communicates with the target AP via its current local AP). The communication between the EP and the target AP may be carried in FT action frames between the EP and its current local AP. Between the current AP and the target AP, the communication may be achieved via an encapsulation method, e.g., such as described in section 13.10.3 of the IEEE 802.11 (2016) specification. The current local AP may convert between the two encapsulations.

A fast and secure roaming technique based on the 802.11r amendment (officially known as fast BSS transition) is the first method to be officially ratified by the IEEE to perform fast secure transitions between Wi-Fi access points. It works by having the client complete an initial successful 802.1X Extensible authentication protocol (EAP) authentication with the authentication server. The resultant master session key (MSK) is, then, transferred to the Wireless LAN controller (WLC) like in other methods. The method, however, differs by deriving a slightly different key hierarchy. A pairwise master key (PMK)-R0 is derived from the MSK is known only to the client and the WLC. A PMK-R1 is derived from PMK-R0 and is known to the client and APs managed by the WLC that holds PMK-R0. The final level is the pairwise transient key (PTK), derived from PMK-R1 and is known to the client and the APs managed by the WLC. Typically, the APs managed by the WLC form a group referred to as a FT mobility domain, which is essentially all APs that have the same SSID. How PMK-R1 is made known to other APs is not defined by the IEEE 802.11r amendment.

During the initial authentication, the client performs full 802.1X authentication, completes the 4-Way Handshake to derive a Pairwise Transient Key Security Association (PTKSA) with the AP (using PMK-R1 key material), and then is allowed access to the network. When the client begins to roam, the client and the target AP derive a new key based on PMK-R1. The method is even more efficient since the four-way handshake takes place within the Open System Authentication from the client, Open System Authentication from the AP, Reassociation Request, and Reassociation Response. This substitutes the four-way handshake, which occurs after these frames in other methods.

There is a lesser deployed variant of this technique known as Fast BSS transition over the Distribution System (DS). With this technique, once the client decides it might roam to another AP, it sends a FT Action Request frame to the original AP. The client indicates the MAC address of the target AP where it wants to roam. The original AP forwards this FT Action Request frame to the target AP over the DS and the target AP responds to the client with an FT Action Response frame (also over the DS). Once this FT Action frame exchange is successful, the client finishes the FT roaming. The client sends the Reassociation Request to the target AP over-the-air and receives a Reassociation Response from the new AP in order to confirm the roaming and final key derivation. These last two messages are exchanged when the client finally roams to the target AP. Therefore, Fast Transition allows roaming faster than static PMK caching.

It is clear that a fast handover is crucial to guarantee the quality of service when an end point is roaming in a multi-cell network. As compared to a RF system, such as a Wi-Fi system, the design challenge is even bigger in a Li-Fi system, considering the smaller optical cell and the smaller overlapping area in an optical communication system.

Figure 6:
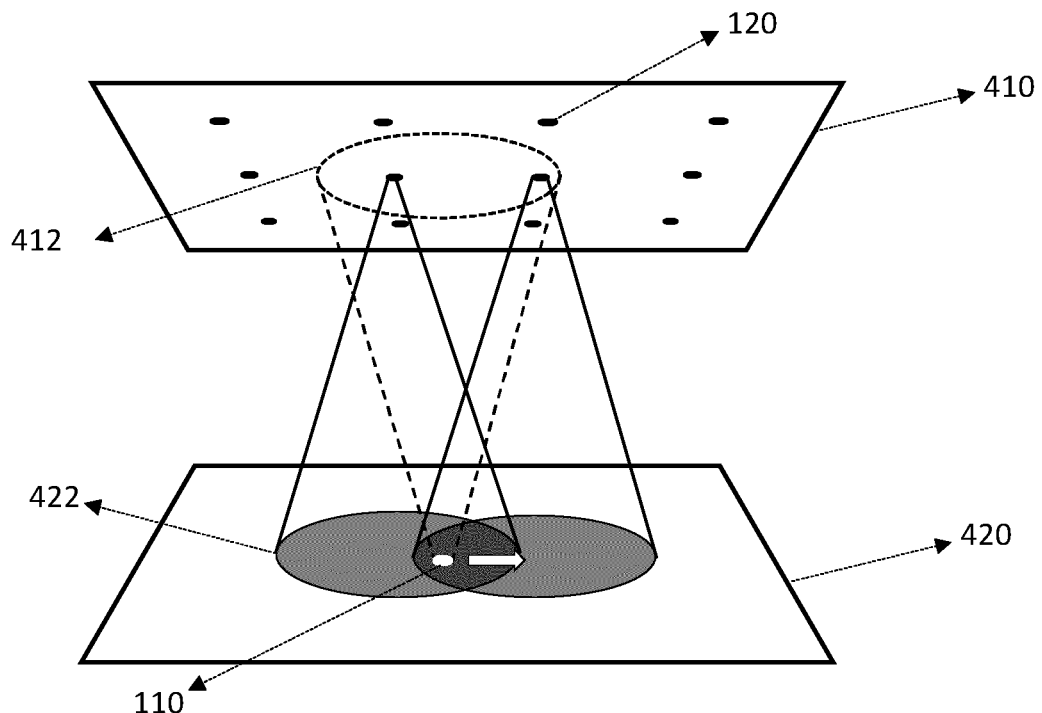
FIG. 6 illustrates an end point roams in an optical multi-cell wireless communication network and the corresponding coverage areas of the end point, an associated access point, and a neighbor access point.

FIG. 6 illustrates an end point 110 roams in an optical multi-cell wireless communication network 100 and the corresponding coverage areas of the end point 110, an associated access point 120, and a neighbor access point 120. The plurality of access points, comprising at least the associated access point and a candidate access point, are located on a first planar surface 410. In a typical application scenario, the first planar surface 410 is the ceiling. On the first planar surface 410, the coverage area 412 of an end point is illustrated by a dash circle, which covers both the associated access point and a neighbor access point. The end point is located on a second planar surface 420, which can be the planar surface of the floor, the table, another horizontal surface that the end point is located, or any arbitrary planar area the end point is roaming with a user. On the second surface 420, the coverage areas 422 of the associated access point and the neighbor access point are illustrated with shadowed circles, and the end point 110 is located in an overlapping area of the two coverage areas. The arrow indicates the moving direction of the end point, which is heading for the neighbor access point and suggests a potential handover. In FIG. 6 the identical coverage areas of an end point and an access point are merely for an exemplary purpose. Depending on the optical components used by the plurality of access points and the end point, the coverage area 422 of an access point 120 and the coverage area 412 of an end point 110 may be different. Furthermore, even if the optical components remain the same, the actual coverage area will also change with the distance between the first and the second planar surfaces.

For the ease of explanation, it is assumed here that each access point 120 comprises a single optical front end, and each dot on the first planar surface 410 represents a different access point 120. Therefore, a fast handover is always necessary when the end point roams to the coverage of an adjacent access point 120. In another example, if an access point comprises more than one optical front ends, a handover may not be necessary when the end point is roaming within the coverage areas of multiple optical front ends belonging to the same access point 120 that is sending identical information via the multiple optical front ends.

Figure 7:
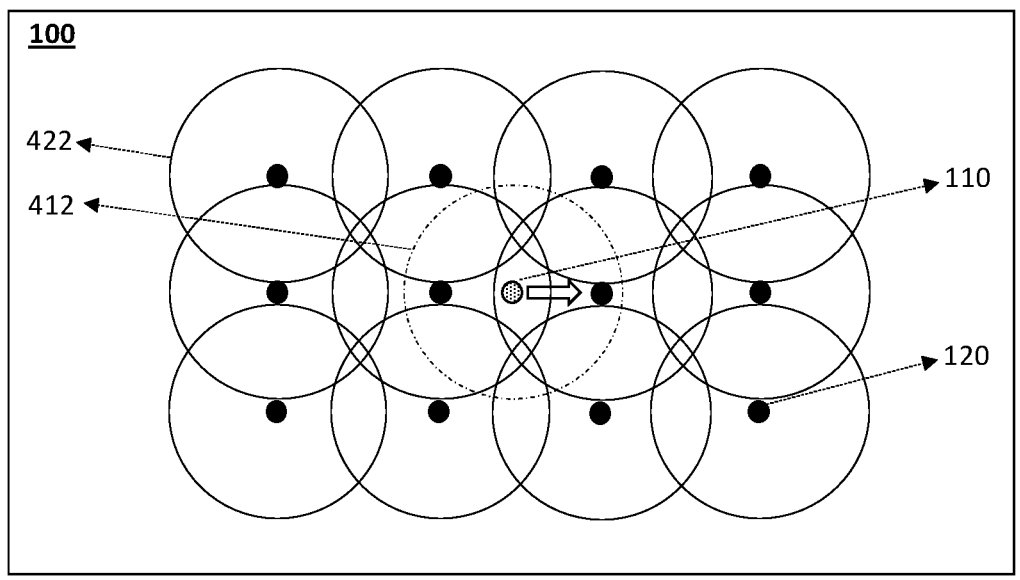
FIG. 7 illustrates an end point roams in an optical multi-cell wireless communication network with an overlay top view of a first planar surface and a second planar surface.

FIG. 7 provides an overlay top view of the first planar surface 410 and the second planar surface 420, when the Li-Fi end point 110 is roaming in the optical multi-cell wireless communication network 100. It can be seen that depending on the moving trajectory of the end point different adjacent access points may be the candidate access point for a potential handover. It is possible that the end point 110 detects a downlink communication from an adjacent access point when the end point enters an overlapping coverage area of a currently associated access point and the adjacent access point. It may also be possible that there is a centralized or distributed function implemented in the network, which may take care of selecting a candidate access point for the end point for a potential handover. Such a centralized or distributed function may select the candidate access point based on an overview of one or more neighboring relationships in the optical multi-cell wireless network.

Figure 8:
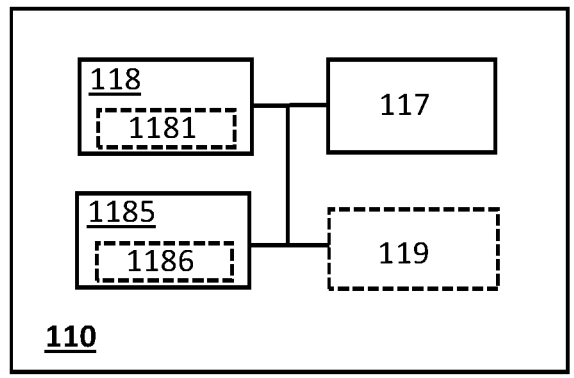
FIG. 8 schematically depicts basic components of an end point subsystem of the present invention.

FIG. 8 schematically depicts basic components of an end point subsystem of the present invention. The end point subsystem 110 comprises at least an optical transceiver 117, a controller 118, and a host processor 1185. The optical transceiver 117 should be understood as a complete Li-Fi transceiver that comprises at least an optical front end 111, an analog front end 112, a digital modulator/demodulator/modem 113, and an interface 114 to an end device that the Li-Fi transceiver is connected to or comprised in. The controller 118 may be a dedicated controller as shown in FIG. 8. The controller 118 may also be a shared controller that carries out part of the functionalities of a typical optical transceiver, such as the digital modulator/demodulator/modem 113 part of the optical transceiver. If the controller carries out the functionality of a digital modulator/demodulator/modem 113 of the optical transceiver 117, the optical transceiver 117 in FIG. 8 may comprise certain parts, such as an optical front end 111 and an analog front end 112, except the digital modulator/demodulator/modem 113. As compared to the controller 118, the host processor 1185 is a main processor and of higher performance, which may also perform many other tasks, such as similar functionalities of an operating system, other than to support optical communication only. In order to derive a pairwise security key or PTK, the end point is represented by two supplicants. A first supplicant 1186 for establishing the initial PTK is comprised in the host processor 1185, while a second supplicant 1181 for establishing a new PTK for a potential handover is comprised in the controller 118. The first supplicant may use a conventional or standard method in the first procedure to derive the initial PTK. The second supplicant carries out the second procedure according to this invention to speed up key provisioning, considering the more critical latency requirement involved in a secure handover of an optical multi-cell wireless network, as compared to a conventional communication network that typically has a larger cell area. The end point may optionally comprise a user interface 119, which can provide users with added convenience of status inquiry or operation.

Figure 9:
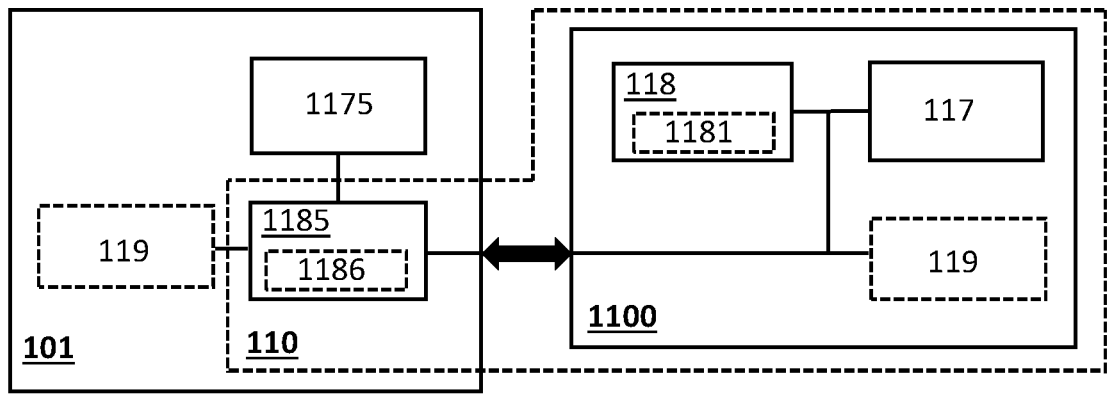

As a slightly different setup of the end point subsystem, FIG. 9 schematically depicts basic components of an end point subsystem 110 of the present invention, when the host processor 1185 is shared with an end device/mobile device 101 that the end point 110 is connected to, communicatively coupled to, or partially integrated in. The controller 118, the optical transceiver 117, and the optional user interface 119 are comprised in a single housing 1100. As an exemplary drawing, the host processor 1185 is now comprised in the end device/mobile device 101, but it can also be a separate processor that is connected to and shared by both the end device/mobile device 101 and the end point 110. The end device/mobile device 101 may also comprise another communication interface 1175, via which the first supplicant 1186 comprised in the host processor 1185 may establish the initial PTK in a conventional method. Thus, the host processor is configured to carry out different tasks, such as an operating system of the end device/mobile device 101, among which it may also support one or more other communication interfaces other than the optical communication as addressed in the present invention. Same as the end point 110, the end device/mobile device 101 is very likely to comprise a user interface 119.

Figure 10:
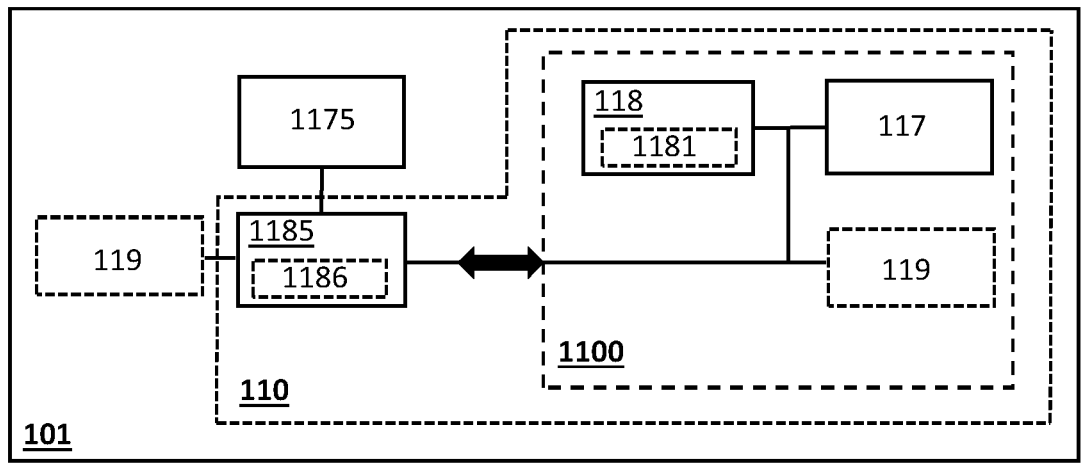

One more alternative setup of the end point subsystem 110 is shown in FIG. 10, where the end point subsystem 110 is fully integrated in an end device/mobile device 101. The host processor 1185 is shared by the end device/mobile device 101 and the end point subsystem 110, while the controller 118 is more dedicated to the tasks related to optical communication. The controller 118, the optical transceiver 117, and the optional user interface 119 of the end point subsystem 110 may be comprised in a single housing 1100 inside the end device/mobile device 101. However, the single housing 1100 in FIG. 10 may not be reflected as a physical boundary but may also indicate an integration of the related components on a same PCB. It may also be that there is no single housing 1100 in such a fully integrated setup.

Figure 11:
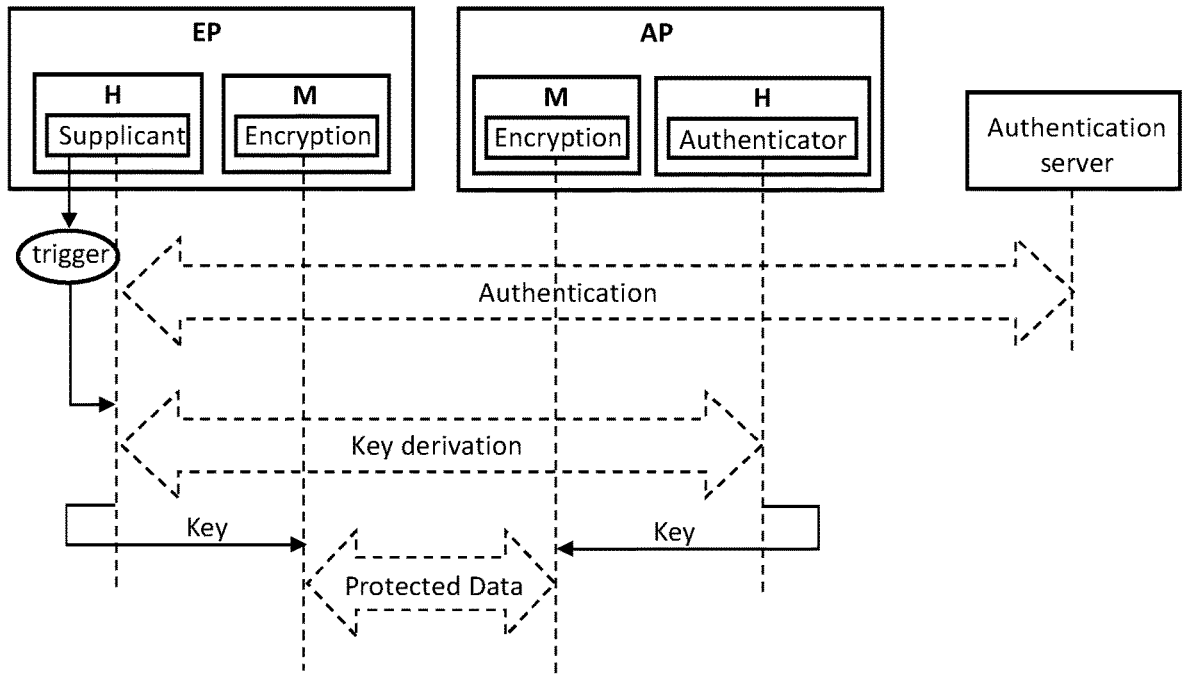
FIG. 11 demonstrates signaling handshake between a supplicant comprised in the end point subsystem and an authenticator comprised in an access point.
Figure 12:
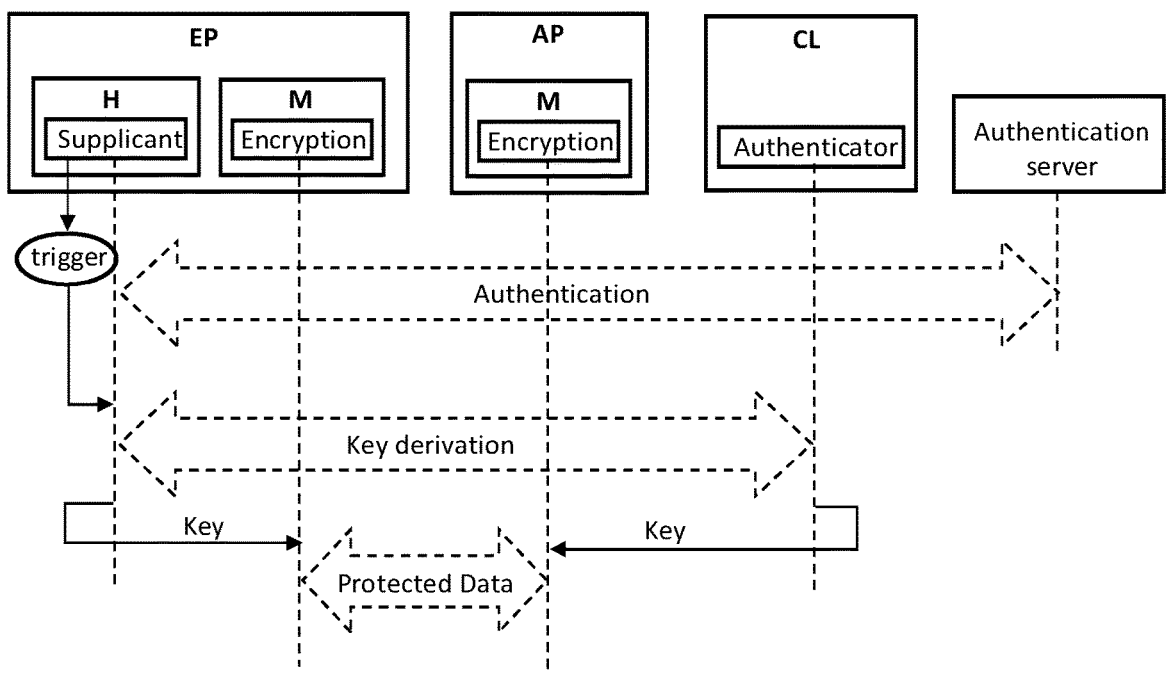
FIG. 12 demonstrates signaling handshake between a supplicant comprised in the end point subsystem and an authenticator comprised in a central controller.

To give an overview of how an optical multi-cell network may fit in an IEEE 802.1X/EAP type of security infrastructure, FIG. 11 and FIG. 12 show two possible implementations. The hollow two-way arrows are used to indicate the signaling flow over logical channels, which may comprise one or more physical channels. A first type of physical channel is the optical link between the end point and the access point. A second type of physical channel is the backbone connection, which is a stable and high-speed link and in certain scenarios may even be an always-connected link.

In FIG. 11, a supplicant of the end point is comprised in the host processor H, and it carries out the steps for authentication and security key derivation. An authenticator is comprised in the host processor H of the access point. The drawing is only for an exemplary purpose, the authenticator may be comprised in one or more access points, but not necessary in the access point that the end point is associated with. The connections among the plurality of access points are backbone connections. By entering the area of the optical multi-cell network, the supplicant on behalf of the end point first runs authentication handshake with an authentication server to obtain a master session key (MSK). Based on the MSK, the supplicant may run a 4-way handshake with the authenticator to derive a pairwise transient key (PTK) to secure a point-to-point link between the end point and the associated access point. Upon obtaining a PTK, the supplicant of the end point will provide the PTK to its modem M of the optical transceiver to encrypt or decrypt the data on the optical ink. Similarly, upon obtaining the PTK, the authenticator will provide the PTK to the modem M of the related access point, either directly (in case the authenticator is comprised in the related access point) or via a backbone connection.

Authentication procedure may be required only once upon an event, such as the end point entering a network, or upon a user command. The same MSK can be reused by the end point to derive a new PTK for a new point-to-point link with another access point in the same network. To handover to a new access point, the end point may be the initiator to trigger a new key derivation procedure for the new access point, upon detection of the new access point. Although it is not shown in the figure, it can also be the case that the authenticator is the initiator to trigger a new derivation procedure, when the authenticator predicts such a potential handover.

As compared to FIG. 11, FIG. 12 provides another example, where an authenticator is comprised in a central controller CL. The authentication procedure is carried out between the supplicant comprised in the end point and the authentication server, which is necessary when the end point first time enters the optical multicell network. This procedure may also be carried out via an existing communication network other than the optical network, as long as the host processor of the end point obtains the MSK. The key derivation procedure is carried out between the supplicant and the authenticator. Upon a PTK derived, the supplicant of the end point will provide the PTK to the modem M of the end point to encrypt and decrypt the data communicated on the optical link; and the authenticator comprised in the central controller will also provide the key to the access point. And then the optical link between the end point and the access point is protected with the derived PTK. Same as in FIG. 11, either the end point or the central controller may trigger the key derivation procedure.

Figure 13:
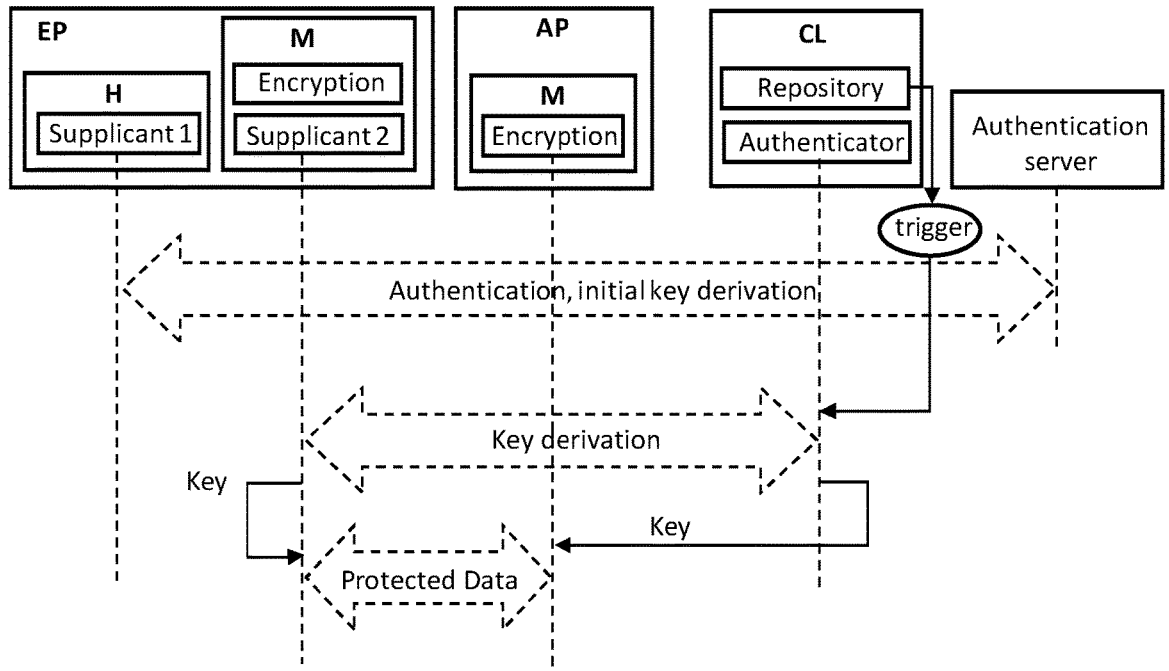
FIG. 13 demonstrates signaling handshake between a second supplicant comprised in the end point subsystem and an authenticator with a trigger event from the central controller.
Figure 14:
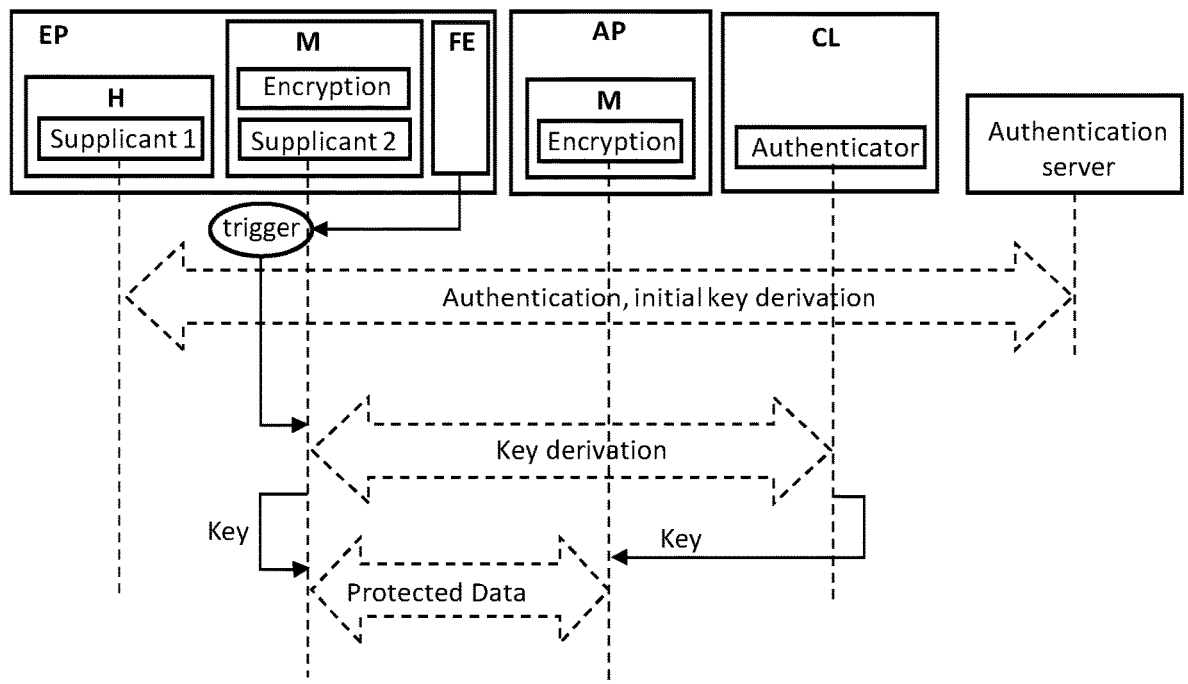
FIG. 14 demonstrates signaling handshake between a second supplicant comprised in the end point subsystem and an authenticator with a trigger event from the end point.

As disclosed in the present invention, it is advantageous that the end point comprises two supplicants or the conventional supplicant functionality is split into two entities, a first supplicant comprised in the host processor H and a second supplicant comprised in the controller C, to speed up the key derivation procedure for the fast secure handover in an optical multi-cell network. The controller is more dedicated to the optical communication, and an active PTK hold by the controller is used in the second procedure of the second supplicant to derive the new PTK. No further interaction with the host processor is needed in the second procedure to derive a new PTK for a potential handover within the optical multi-cell network. Thus, the proposed method effectively reduces the latency in deriving a new PTK. FIG. 13 and FIG. 14 provides exemplary implementation of the system. In both examples, the authenticator is comprised in the central controller CL. However, as already shown in FIG. 11, the authenticator function may also be comprised in one or more access points in the network.

In FIG. 13, it shows that the first supplicant comprised in the end point subsystem may take care of a conventional authentication procedure with the authentication server. The first supplicant is also responsible to establish an initial PTK for the end point. In the figure, although the authentication procedure and the initial key derivation procedure are combined in a single arrow for the ease of illustration. In practice the two procedures are carried out sequentially and may be triggered by two separate trigger signals, which are not shown in the figure. The host processor only needs to provide the initial PTK to the controller C of the end point once, when the end point does not have a secure optical link. Afterwards, the key derivation procedure is between the second supplicant and the authenticator. The central controller CL may comprise a repository, which comprises the information related to the association among the end point and the access points, one or more neighbor relationships among the access points, or some other location information. The central controller may foresee a potential handover of the end point to an access point, and then it may trigger the authenticator to be the initiator to start the key derivation procedure with the second supplicant comprised in the end point to establish a new PTK.

FIG. 14 provides another example, where the trigger of the new key derivation procedure is not generated by the central controller CL but is generated by the end point itself. One possibility is that the optical front end of the end point detects a downlink communication of an access point, and it may trigger the second supplicant to start a new key derivation procedure.

From FIG. 13 and FIG. 14, it can be seen that the disclosed new key derivation between the second supplicant and the authenticator may be applied before or during a handover in the optical network, as well as when the end point tries to build up a secure optical link in the optical multi-cell network for the first time. In the later case, the initial PTK may be first established by the first supplicant via a conventional communication network. And then the second supplicant makes use of the initial PTK in establishing a new PTK for the optical communication.

Figure 15:
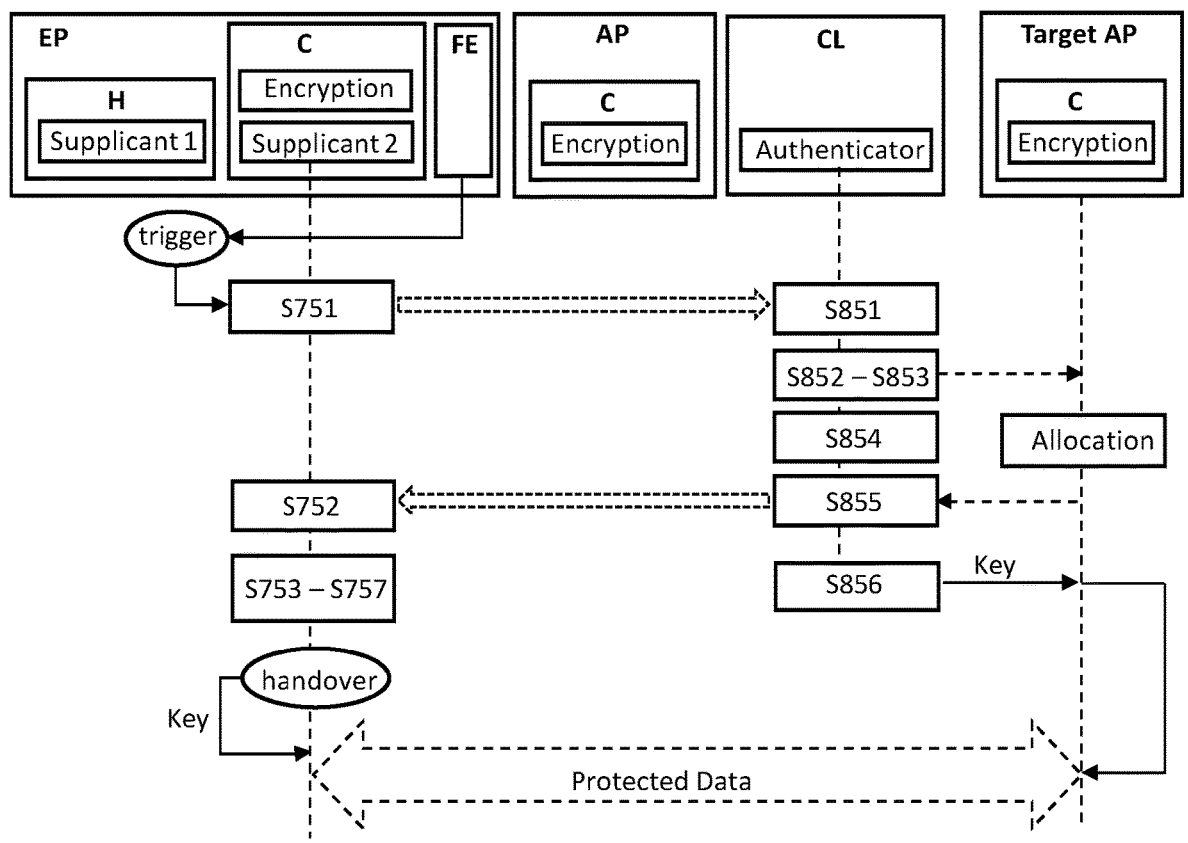
FIG. 15 demonstrates signaling handshake of the second procedure carried out between a second supplicant comprised in an end point and an authenticator.

FIG. 15 demonstrates more detailed signaling handshake of the second procedure carried out between a second supplicant comprised in an end point subsystem and an authenticator. In this example, the optical front end of the end point detects the presence of the candidate access point or target AP for a potential handover, which may be the case when the end point enters an coverage overlapping area of an associated access point and the target access point. Then the end point will trigger the second supplicant to start the second procedure to establish a new PTK for the target AP, by first sending a request to the authenticator. The second procedure may also comprise a resource allocation step. As shown in FIG. 15, after the authenticator successfully verifies the request from the second supplicant in step S853, the authenticator may continue with step S854 to derive a new PTK. In parallel, the authenticator may also send a request/command/instruction to the target AP to ask the target AP to prepare for resource allocation to the related end point. Furthermore, such a request/command/instruction may further comprise a timer about a validity period of the request, or a timer about when the resource allocation should be materialized. And then the target AP may provide a feedback to the authenticator to confirm if such a resource allocation for a new end point is possible. Such feedback about resource allocation may be piggybacked in the confirmation sent to the second supplicant in step S855.

As disclosed earlier on, the new PTK may have a certain lifetime or validity period. If the handover does not take place within that validity period, the new PTK may simply expire without putting in use. Similarly, the resource allocated to the end point in the target AP will also be released if the handover does not take place within a certain time window.

Figure 16:
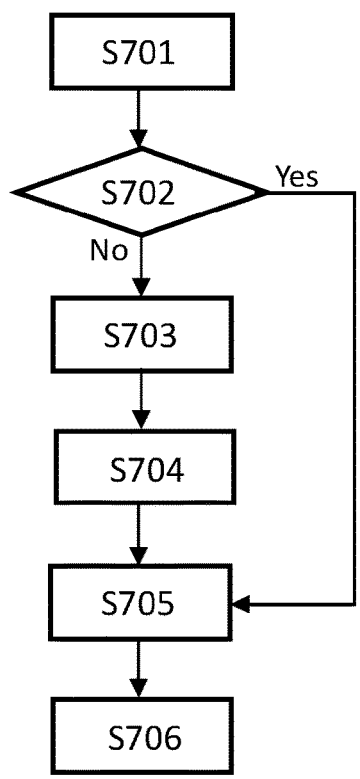
FIG. 16 shows a flow diagram of a method carried out by an end point subsystem.
Figure 17:
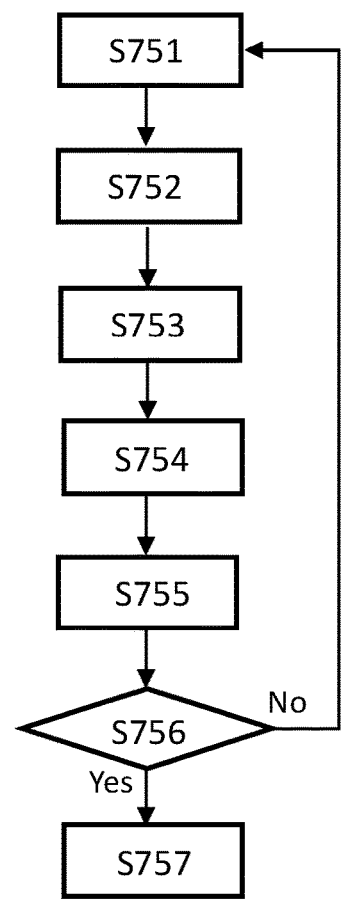
FIG. 17 shows a flow diagram of the second procedure carried out by an end point subsystem.

FIG. 16 shows a flow diagram of a method 700 carried out by an end point subsystem 110 for performing a secure handover from an access point currently associated with the end point subsystem 110 to another access point out of a plurality of access points 120 in an optical multi-cell wireless communication network 100. As one way to implement the method, in step S701, the host processor acts as a first supplicant 1186 to carry out a first procedure for establishing an initial pairwise transient key with an authenticator for the end point, and then the end point checks in step S702 if it has a secure connection. If not, in step S703 the host processor will provide the initial pairwise transient key to the controller 118 for use as an active pairwise transient key, and in step S704 to perform optical wireless communication, and then in step S705 to secure the optical link with the active pairwise transient key. If the end point already has a secure optical connection, the end point will continue to step S705 to carry out secure optical communication. In step 706, upon an internal or external trigger, the controller acts as a second supplicant 1181 to prepare for a secure handover to a candidate access point out of the plurality of access points, by carrying out a second procedure 750 for establishing a new pairwise transient key for the end point 110 and the candidate access point with the authenticator FIG. 17 shows a flow diagram of the second procedure 750 carried out by an end point 110. In step S751, the second supplicant sends to the authenticator a request comprising at least a first nonce, a first frame counter, and a first message integrity code derived based on the pairwise transient key. In the request, a plain text comprises at least the first nonce, the first frame counter, and the first message integrity code is generated with the active PTK of the controller based on the plain text. When the second procedure is triggered by the end point itself, the request may also comprise a unique identifier of the candidate access point. The second supplicant then receives in step S752 from the authenticator a confirmation comprising at least a second nonce, a second frame counter, and a second message integrity code. Similar to the request message, the second nonce and the second frame counter build up the plain text part of the confirmation message, and the second message integrity code is derived from the new PTK and the plain text part of the confirmation message. By extracting the second nonce from the confirmation received in step S753, the second supplicant can derive a local new pairwise transient key in step S754. With the locally derived new pairwise transient key, the second supplicant can generate, in step S755, a local message integrity code according to the plain text part in the confirmation received. By verifying the second frame counter and the second message integrity code against the first frame counter and the local message integrity code in step S756, the end point will then adopt the locally derived new pairwise transient key as the new pairwise transient key in step S757.

Figure 18:
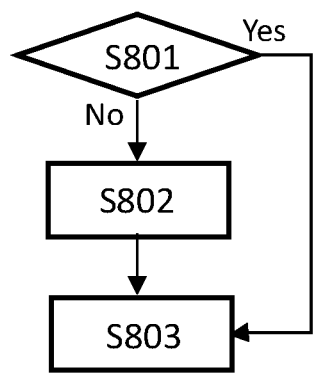
FIG. 18 shows a flow diagram of a method carried out by an authenticator.

FIG. 18 shows a flow diagram of a method 800 carried out by an authenticator for supporting an end point 110 to carry out a secure handover from an access point currently associated with the end point to another access point out of a plurality of access points 120 in an optical multi-cell wireless communication network 100. In step S801, it is checked if the end point has a secure connection. If not, a first procedure will be carried out between a first supplicant 1186 comprised in the end point and the authenticator for establishing an initial pairwise transient key for the end point. The first procedure may be carried out via another communication network, other than the optical multi-cell network. In step S803, the authenticator is configured to carry out a second procedure 850 with a second supplicant 1181 comprised in the end point for establishing a new pairwise transient key for the end point and a candidate access point out of the plurality of access points to prepare for a secure handover of the end point to the candidate access point.

Figure 19:
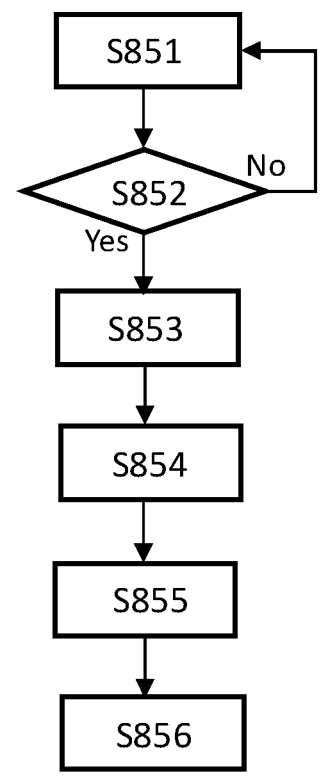
FIG. 19 shows a flow diagram of the second procedure carried out by an authenticator.

FIG. 19 shows a flow diagram of the second procedure 850 carried out by an authenticator, which is a counterpart of the second procedure 750 carried out by the second supplicant. In step S851, the authenticator receives from the second supplicant 1181 the request comprising at least the first nonce, the first frame counter, and the first message integrity code. And then, the authenticator verifies, in step S852, the first frame counter and verifying the first message integrity code based on the pairwise transient key. Upon successful verification of the first frame counter and the first message integrity code, the authenticator extracts the first nonce from the second supplicant in step S853. Based on the first nonce extracted, the second supplicant can derive the new pairwise transient key in step S854. Optionally, in parallel to step S854, the authenticator may also send a request/command/instruction to the target AP to ask the candidate access point/target AP to prepare for resource allocation to the related end point. In step S855, the authenticator sends to the second supplicant 1181 a confirmation comprising at least a second nonce, a second frame counter, and a second message integrity code derived based on the new pairwise transient key. Optionally, the confirmation may also comprise a feedback from the candidate access point/target AP related to the request for resource allocation for the potential handover. In step S856, the authenticator will also inform the candidate access point about the new pairwise transient key.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. An end point subsystem for performing a secure handover from an access point currently associated with the end point subsystem to another access point out of a plurality of access points in an optical multi-cell wireless communication network, the end point subsystem comprising:
   an optical transceiver configured to perform optical wireless communication;
   a controller configured to secure an optical wireless communication link with the currently associated access point by using a pairwise transient key to encrypt or decrypt data communicated on the link;
   a shared host processor, separate from the controller, configured to act as a first supplicant to carry out a first procedure for establishing an initial pairwise transient key with an authenticator for the end point subsystem in the optical multi-cell wireless communication network, when the end point subsystem does not have an established secure connection, wherein the first procedure is carried out via another communication technology rather than optical wireless communication;
   wherein the shared host processor is shared by the end point subsystem and a device that the end point subsystem is connected to, communicatively coupled to, or partially or entirely integrated in; and
   the controller is further configured to act as a second supplicant to prepare for a secure handover to a candidate access point out of the plurality of access points, by carrying out a second procedure for establishing a new pairwise transient key for the end point subsystem and the candidate access point with the authenticator; wherein the second procedure is carried out via optical wireless communication, and
   the shared host processor is further configured to provide the initial pairwise transient key to the controller for use as the pairwise transient key, when the end point subsystem does not have a secure optical connection.

2. The end point subsystem of claim 1, wherein the optical transceiver is further configured to:
   receive information related to the candidate access point from either the currently associated access point or the candidate access point; and
   trigger the controller to initiate the second procedure upon the reception of the information related to the candidate access point.

3. The end point subsystem of claim 2, wherein the information related to the candidate access point is a downlink advertisement received from the candidate access point.

4. The end point subsystem of claim 1, wherein the optical transceiver is further configured to:
   compare link qualities of optical wireless communication links with the currently associated access point and the candidate access point respectively;
   trigger the controller to start handover to the candidate access point based on the comparison on link qualities.

5. The end point subsystem of claim 1, wherein the pairwise transient key between the end point subsystem and the currently associated access point is used in the second procedure for establishing the new pairwise transient key.

6. The end point subsystem of claim 1, wherein the optical transceiver and the controller are comprised in a single housing, which is attached to a device comprising the shared host processor.

7. A system for supporting the end point subsystem according to claim 1 to carry out a secure handover from an access point currently associated with the end point subsystem to another access point out of a plurality of access points in an optical multi-cell wireless communication network, the system comprising:
   the end point subsystem;
   the plurality of access points, comprising the currently associated access point and the candidate access point, configured to perform optical wireless communication with the end point subsystem and to connect via a backbone connection with one another and/or with a central controller; and
   an authenticator configured to carry out a first procedure with a first supplicant and a second procedure with a second supplicant, and wherein the first supplicant is the shared host processor comprised in the end point subsystem and the second supplicant is the controller, separate from the shared host processor, comprised in the end point subsystem.

8. The system of claim 7, wherein the authenticator is comprised in the central controller connected with the plurality of access points via backbone connections.

9. The system of claim 7, wherein the authenticator is comprised in an access point out of the plurality of access points, and wherein the access point is configured to communicate with other access points out of the plurality of access points via backbone connections.

10. The system of claim 7, wherein the authenticator is further configured to provide the new pairwise transient key to the candidate access point.

11. A method of an end point subsystem for performing a secure handover from an access point currently associated with the end point subsystem to another access point out of a plurality of access points in an optical multi-cell wireless communication network, the method comprising:
   performing optical wireless communication;
   securing an optical wireless communication link with the currently associated access point by using a pairwise transient key to encrypt or decrypt data communicated on the link;
   acting, by a shared host processor comprised in the end point subsystem, as a first supplicant to carry out a first procedure for establishing an initial pairwise transient key with an authenticator for the end point subsystem, when the end point subsystem does not have an established secure connection; wherein the first procedure is carried out via another communication technology rather than optical wireless communication;
   acting, by a controller, separate from the shared host processor, comprised in the end point subsystem, as a second supplicant to prepare for a secure handover to a candidate access point out of the plurality of access points, by carrying out a second procedure for establishing a new pairwise transient key for the end point subsystem and the candidate access point with the authenticator; wherein the second procedure is carried out via optical wireless communication; and
   providing the initial pairwise transient key from the shared host processor to the controller for use as the pairwise transient key, when the end point subsystem does not have a secure optical connection.

12. The method of claim 11, wherein the second procedure comprises the steps of the second supplicant:

sending to the authenticator a request comprising at least a first nonce, a first frame counter, and a first message integrity code derived based on the pairwise transient key;

receiving from the authenticator a confirmation comprising at least a second nonce, a second frame counter, and a second message integrity code derived from the new pairwise transient key;

extracting the second nonce from the confirmation received;

deriving a local new pairwise transient key based on the second nonce extracted;

generating a local message integrity code based on the locally derived new pairwise transient key;

verifying the second frame counter and the second message integrity code against the first frame counter and the local message integrity code;

adopting the locally derived new pairwise transient key as the new pairwise transient key, upon successful verification of both the second frame counter and the second message integrity code.

13. A non-transitory computing readable medium comprising instructions which, when the instructions are executed by processors of an end point subsystem, cause the processor to perform the method of claim 11.

* * * * *